United States Patent
Honmura et al.

(10) Patent No.: US 10,154,113 B2
(45) Date of Patent: Dec. 11, 2018

(54) COMPUTER SYSTEM

(71) Applicant: HITACHI, LTD., Tokyo (JP)

(72) Inventors: Tetsuro Honmura, Tokyo (JP); Yoshifumi Fujikawa, Tokyo (JP); Keisuke Hatasaki, Tokyo (JP); Mitsuhiro Okada, Tokyo (JP); Akifumi Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 81 days.

(21) Appl. No.: 15/505,751

(22) PCT Filed: Oct. 17, 2014

(86) PCT No.: PCT/JP2014/077674
§ 371 (c)(1),
(2) Date: Feb. 22, 2017

(87) PCT Pub. No.: WO2016/059715
PCT Pub. Date: Apr. 21, 2016

(65) Prior Publication Data
US 2017/0279918 A1  Sep. 28, 2017

(51) Int. Cl.
| G06F 12/08 | (2016.01) |
| H04L 29/08 | (2006.01) |
| G06F 3/06 | (2006.01) |
| G06F 12/0804 | (2016.01) |
| G06F 12/0868 | (2016.01) |
| G06F 12/0875 | (2016.01) |

(52) U.S. Cl.
CPC ........... *H04L 67/2852* (2013.01); *G06F 3/06* (2013.01); *G06F 12/08* (2013.01); *G06F 12/0804* (2013.01); *G06F 12/0868* (2013.01); *G06F 12/0875* (2013.01); *G06F 2212/1024* (2013.01)

(58) Field of Classification Search
None
See application file for complete search history.

(56) References Cited

U.S. PATENT DOCUMENTS

| 8,407,377 | B1 | 3/2013 | Shapiro et al. |
| 2005/0071549 | A1* | 3/2005 | Tross .................. G06F 11/2076 711/113 |
| 2006/0085598 | A1 | 4/2006 | Nemoto et al. |
| 2009/0043959 | A1 | 2/2009 | Yamamoto |

(Continued)

FOREIGN PATENT DOCUMENTS

| JP | 2006-119786 A | 5/2006 |
| JP | 2009-043030 A | 2/2009 |
| JP | 2014-154155 A | 8/2014 |

OTHER PUBLICATIONS

International Search Report of PCT/JP2014/077674 dated Jan. 6, 2015.

*Primary Examiner* — Duc Doan
(74) *Attorney, Agent, or Firm* — Mattingly & Malur, PC

(57) ABSTRACT

A computer system according to one preferred embodiment of the present invention has a server and a storage subsystem, wherein the server is configured to enable data write to a cache area of the storage subsystem. Further, the server manages the usages of the cache area. When storing data from the server to the cache area, the server determines whether a data-writable area exists in the cache area or not. If there is a writable area, data is stored in the writable area.

15 Claims, 22 Drawing Sheets

(56) References Cited

U.S. PATENT DOCUMENTS

2011/0307680 A1   12/2011  Yamamoto
2013/0067152 A1    3/2013  Yamamoto
2014/0223071 A1    8/2014  Bert et al.
2014/0289459 A1    9/2014  Yamamoto

* cited by examiner

Fig. 15

| \<Address\> | 401' |
|---|---|
| X | Command |
| X+CSZ | Command |
| X+CSZ × 2 | Command |
| | |
| X+CSZ × (M-1) | Command |
| ... | ... |
| | 402' |
| Y | Data(Data, Attrib) |
| Y+DSZ | Data(Data, Attrib) |
| Y+DSZ × 2 | Data(Data, Attrib) |
| | |
| Y+DSZ × (M-1) | Data(Data, Attrib) |
| ... | ... |

COMPUTER SYSTEM

TECHNICAL FIELD

The present invention relates to a data transfer technique in a computer system.

BACKGROUND ART

Along with the advancement of IT and the spreading of the Internet, the amount of data handled by computer systems of companies and the like is increasing continuously, and storage subsystems storing such data are required to have high performance.

In the past, various techniques have been introduced to enhance the data access performance. One of such techniques is DMA (Direct Memory Access). A DMA engine is provided to a host computer and/or a storage subsystem, and data transfer processing is made to be performed by the DMA engine instead of the CPU in the host computer or the storage subsystem. Thereby, the overhead of CPU in the host computer or the storage subsystem can be reduced, and as a result, the performance of the system can be improved. For example, according to Patent Literature 1, a host writes a command to a storage when transferring (read or write) data between the host and the storage. A technique is disclosed where, based on the written command, the storage makes the DMA engine to transfer the access target data stored in the memory of the host to a storage area (memory and the like) in the storage.

Another conventional technique is a cache technique. By storing write data from the host computer or data frequently accessed from the host computer to a cache memory composed of DRAMs and the like, the access performance can be improved compared to when access is performed to a storage device having a low access performance, such as HDDs or SSDs.

CITATION LIST

Patent Literature

[PTL 1] U.S. Pat. No. 8,407,377

SUMMARY OF INVENTION

Technical Problem

Recently, the storage capacity of storage subsystems are expanding, and along therewith, the capacity of cache memories being installed to the storage subsystem is also increasing. When storing data (write data) to be written to a certain location within a volume subjected to the write request from the host computer to the cache, the processor of the storage subsystem must search the cache area to which write data should be stored. Specifically, when a cache area storing data before update of the write target data exists, that area is searched for. In another example, the cache area having no data stored therein must be searched for. The load caused by this search is increased along with the increase of storage capacity of the storage subsystem. Therefore, when the storage capacity is increased, it becomes difficult to improve the access performance.

Solution to Problem

A computer system according to one preferred embodiment of the present invention has a server and a storage subsystem, and the server manages the usages of the cache area in the storage subsystem. When the server stores data in the cache area, the server judges whether data writable area exists in the cache area or not. When the data writable area exists, data is stored in the writable area.

Advantageous Effects of Invention

The present invention enables to reduce the processing load of the storage controller during the write processing.

BRIEF DESCRIPTION OF DRAWINGS

FIG. 15 is an explanatory view of command and data storing areas in a computer system according to Embodiment 3.

DESCRIPTION OF EMBODIMENTS

Now, the preferred embodiments of the present invention will be described with reference to the drawings. The preferred embodiments described below are not intended to limit the scope of the invention defined in the claims, and further, not all the components and the combination of the components described in the preferred embodiments are indispensable for the present invention.

In the following description, the processes are sometimes described using the term "program" as the subject, but actually, the determined processes are performed by a processor executing the program. However, the term program is sometimes used as the subject of the processes to prevent lengthy description. A part of or all the programs can be implemented by a dedicated hardware. The respective programs can be installed to various devices via a program distribution server or a computer-readable storage media. The storage media can be, for example, IC cards, SD cards or DVDs.

Embodiment 1

Figure 1:
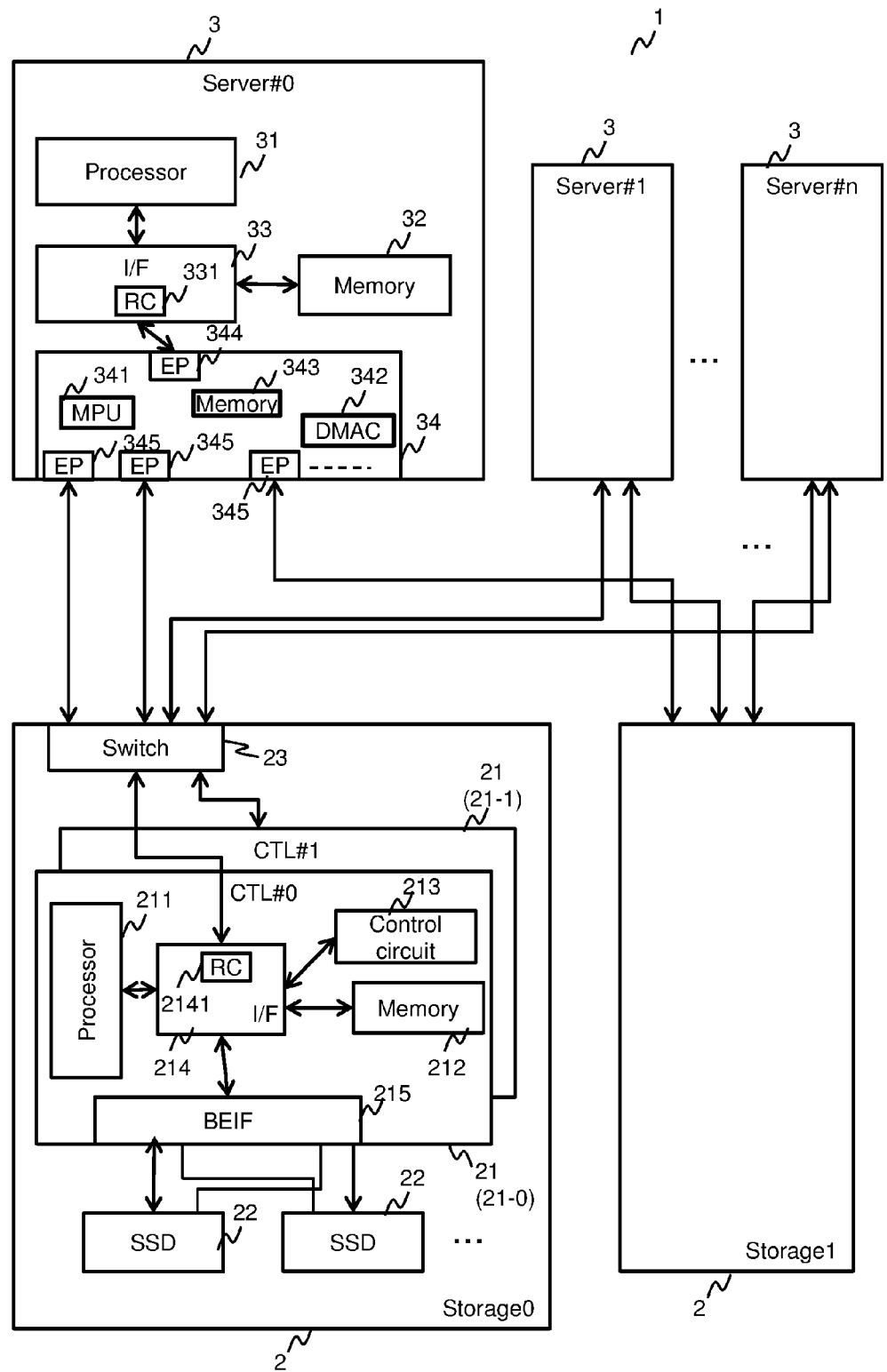
FIG. 1 illustrates a configuration example of a computer system according to Embodiment 1.

FIG. 1 illustrates a configuration of a computer system 1 according to Embodiment 1. The computer system 1 comprises one or more storage subsystem 2, and one or more servers 3. The server 3 is an apparatus for executing programs (such as DBMS) used by the user for business use and the like. The storage subsystem 2 is an apparatus for providing volume for storing data used by the server 3.

The server 3 includes a processor 31, a memory 32, an interface (I/F) 33, and a transfer module 34. The processor 31 executes programs used by the user for business and the like. In the drawing, there is only one processor 31 illustrated, but it is also possible to have multiple processors 31. The processor 31 can be a multi-core processor.

The memory 32 is used as a main storage of the processor 31. When the processor 31 executes programs, the programs and data are loaded to the memory 32, then the processor 31 reads the programs from the memory 32 and executes it.

The I/F 33 is a component for managing data transfer among the processor 31, the memory 32 and peripheral devices (such as a network device not shown; the transfer module 34 described later is also a kind of the peripheral devices). The computer system 1 of Embodiment 1 assumes a case where communication according to PCI-Express (hereinafter referred to as "PCIe") standards is performed between the I/F 33 and the peripheral devices.

Further, the transfer module 34 (sometimes abbreviated as "Trans" in the drawings) is a component for controlling data transfer between the server 3 and the storage subsystem 2. The transfer module 34 is connected to the processor 31 via the I/F 33. In Embodiment 1, the communication between the transfer module 34 and the I/F 33 is performed in accordance with PCIe standards.

The storage subsystem 2 includes one or more controllers (hereinafter also referred to as "CTL") 21, one or more drives 22, and a switch 23. The CTL 21 processes data access requests (such as read command and write command) arriving from the server 3. In Embodiment 1, the configuration where the storage subsystem 2 has two controllers 21 will mainly be described. However, the storage subsystem 2 can have more than two controllers 21. Further, it is possible to adopt a configuration where the storage subsystem 2 has only one controller 21.

In the following, one of the two controllers 21 is called CTL #0 (21-0), and the other one of the controllers 21 is called CTL #1 (21-1). The CTL #0 (21-0) and CTL #1 (21-1) are connected via an inter-controller communication path (not shown), and can mutually communicate control information.

The drives 22 are nonvolatile storage devices storing write data from the server 3, and for example, SSDs (Solid State Drives) or HDDs (Hard Disk Drives) are used. In the drawing, the drive 22 is referred to as "SSD 22". In the storage subsystem 2 according to Embodiment 1, each drive 22 is connected to two CTLs 21, so that both the CTL #0 and the CTL #1 can access (read or write) the respective drives 22. The storage subsystem 2 creates a volume using the storage area of one or multiple drives 22. Therefore, "accessing (reading or writing) a volume" is equivalent to accessing the drive 22.

The switch 23 is a component for connecting the storage subsystem 2 to multiple servers 3, and in the computer system 1 according to Embodiment 1, the switch 23 is a PCI-Express switch.

We will now describe the internal configuration of the CTL 21. The CTL 21 comprises a processor 211, a memory 212, a control circuit 213, an interface (I/F) 214, and a backend interface (BEIF) 215. The processor 211 processes the I/O requests from the server 3. In the storage subsystem 2 according to Embodiment 1, by having the program for processing I/O requests from the server 3 and the like executed in the processor 211, the processor 211 performs a process to read the data subjected to the read request issued from the server 3 from the drive 22 and return the same to the server 3, or a process to write the data subjected to the write request issued from the server 3 to the drive 22.

The memory 212 is a storage media for storing programs and control information used by the processor 211. Generally, a storage element having a high access performance, such as a DRAM, is used as the memory 212. However, a storage element other than the DRAM can also be used. The memory 212 is also used as a cache memory for temporarily storing the write data from the server 3 or the data read from the drive 22. In the following description, the area used as the cache memory out of the areas of the memory 212 is called a "cache area".

In the storage subsystem 2 according to Embodiment 1, the write data from the server 3 is temporarily stored in the cache area, and thereafter, written from the cache area to the drive 22. The process for writing data from the cache area to the drive 22 is called "destaging". Further, when the storage subsystem 2 receives a read request from the server 3, the data read from the drive 22 is temporarily stored in the cache area, and thereafter, the data is transferred from the cache area to the server 3. The process for storing the data read from the drive 22 to the cache area is called "staging".

The control circuit 213 is a hardware for performing a given operation to the data. For example, it has a function for performing calculation and verification of CRC (Cyclic Redundancy Check) of data. Further, in a case that the storage subsystem 2 creates a redundant information (parity) by RAID (Redundant Arrays of Inexpensive/Independent Disks) technique and stores the parity to the drive 22 together with the data when the storage subsystem 2 stores data into the drive, parity generation is done by the control circuit 213. However, as another embodiment, the processor 211 may calculate and verify the CRC, and performs parity generation. In that case, the control circuit 213 is unnecessary.

The I/F 214 is a component serving a function similar to the I/F 33 of the server 3. In other words, the I/F 214 is a component for connecting components, such as the processor 211 and the memory 212, or the transfer module 34 of the server 3 and the BEIF 215 described later. Similar to the I/F 33, the communication between the I/F 214 and the transfer module 34 or the BEIF 215 is performed in compliance with PCIe standards.

The BEIF 215 is an interface for connecting the CTL 21 and the drives 22. If the drive 22 is a storage device in compliance with SAS (Serial Attached SCSI) standards, the BEIF 215 performs protocol conversion between PCIe and SAS.

As mentioned above, in the computer system 1 according to Embodiment 1, multiple servers 3 and multiple storage subsystems 2 are mutually connected, and the respective servers 3 are connected in an accessible manner to the respective storage subsystems 2. However, the following description mainly describes a configuration where one server 3 is connected to one storage subsystem 2.

We will now describe the connection between the server 3 and the storage subsystem 2. The I/F 33 has a PCIe root complex (hereinafter also denoted as "RC") 331, and the transfer module 34 has an endpoint (hereinafter also denoted as "EP") 344, which is a terminal device of the PCIe tree. The endpoint 344 is connected to the RC 331. Further, a part or all of the resisters and memories included in the respective components (MPU 341, DMAC 342, and memory 343) of the transfer module 34 are mapped to an address in the PCIe space. Thereby, the processor 31 can access the DMAC 342 or the memory 343 of the transfer module 34 by issuing an input/output request designating the address of the PCIe space. Similarly, the DMAC 342 of the transfer module 34 can transfer the data acquired from the storage subsystem 2 to the memory 32.

The I/F 214 of the storage subsystem 2 has an RC 2141 of PCIe, and the RC 2141 is connected to an EP 345 of the transfer module 34. Since the PCIe space to which the RC 331 and the EP 344 belong is a different space as the PCIe space to which the RC 2141 and the EP 345 belong, the processor 31 cannot directly access the respective components such as the memory 212 in the storage subsystem 2. However, a part or all of the resisters and memories in the respective components (the MPU 341, the DMAC 342 and the memory 343) of the transfer module 34 are mapped to the address in the PCIe space to which the RC 2141 and the EP 345 belong. Thereby, the MPU 341 or the DMAC 342 of the transfer module 34 can transfer the data from the server 3 to the memory 212 of the storage subsystem 2. Further, each of the I/F 33 and the I/F 214 has a DMAC. The server 3 and the storage subsystem 2 can transfer the data in the memory 32 or the memory 212 to the transfer module 34 (or in the opposite way) by using the DMAC.

The configuration of the server 3 and the storage subsystem 2 is not restricted to the configuration described above, and other configurations can be adopted. For example, regarding the configuration of the storage subsystem 2, a storage element other than the DRAM, such as a flash memory or other nonvolatile storage media, can be used as the memory 212. Further, the memory 212 can be configured as a memory module having a part or all of the functions (such as a function for generating parity mentioned earlier) of the control circuit 213, instead of a simple storage element. In this case, the memory module is composed of a flash memory and/or a DRAM and a memory controller having the functions similar to the control circuit 213, so that data processing such as parity generation can be performed in the memory module. However, even when a configuration having a memory module is adopted, the server (transfer module 34) needs to be configured that it can directly write data to the flash memory or the DRAM in the memory module. Furthermore, instead of replacing the memory 212 by the memory module, a configuration can be adopted where the memory module is provided in addition to the memory 212. In this case, for example, it is preferable to adopt a configuration where the memory module is used as a cache area.

Next, we will describe the flow of the processing performed when the server 3 writes data into the volume of the storage subsystem 2 in the computer system 1 according to Embodiment 1. In the conventional computer system, when storing the write data from the server to the volume of the storage subsystem, the storage subsystem carries out an allocation processing of the storing area of the write data. Specifically, an area capable of storing the write data is allocated in the cache memory of the storage subsystem. The area capable of storing the write data is, for example, an area in the cache memory where data is not yet stored. The storage subsystem refers to the management information in the cache memory area to search for an address of the area where no data is stored therein. Further, there may be a case where the data in the write target area (assuming that the address (LBA) of the area is address x) of the volume is cached in the cache memory. In that case, the storage subsystem searches for the area where the data of address x of the volume is cached. The time required to perform these processes will be elongated as the capacity of the volume and the capacity of the cache memory increases. The computer system 1 according to Embodiment 1 aims at reducing such time-consuming processes.

The computer system 1 according to Embodiment 1 is capable of performing the write processing carried out in a conventional computer system, and is also equipped with a function to execute data write without performing the conventional process of allocating a cache area in the storage subsystem as described above. In the following description, this function is called a "high-speed write function".

Figure 2:
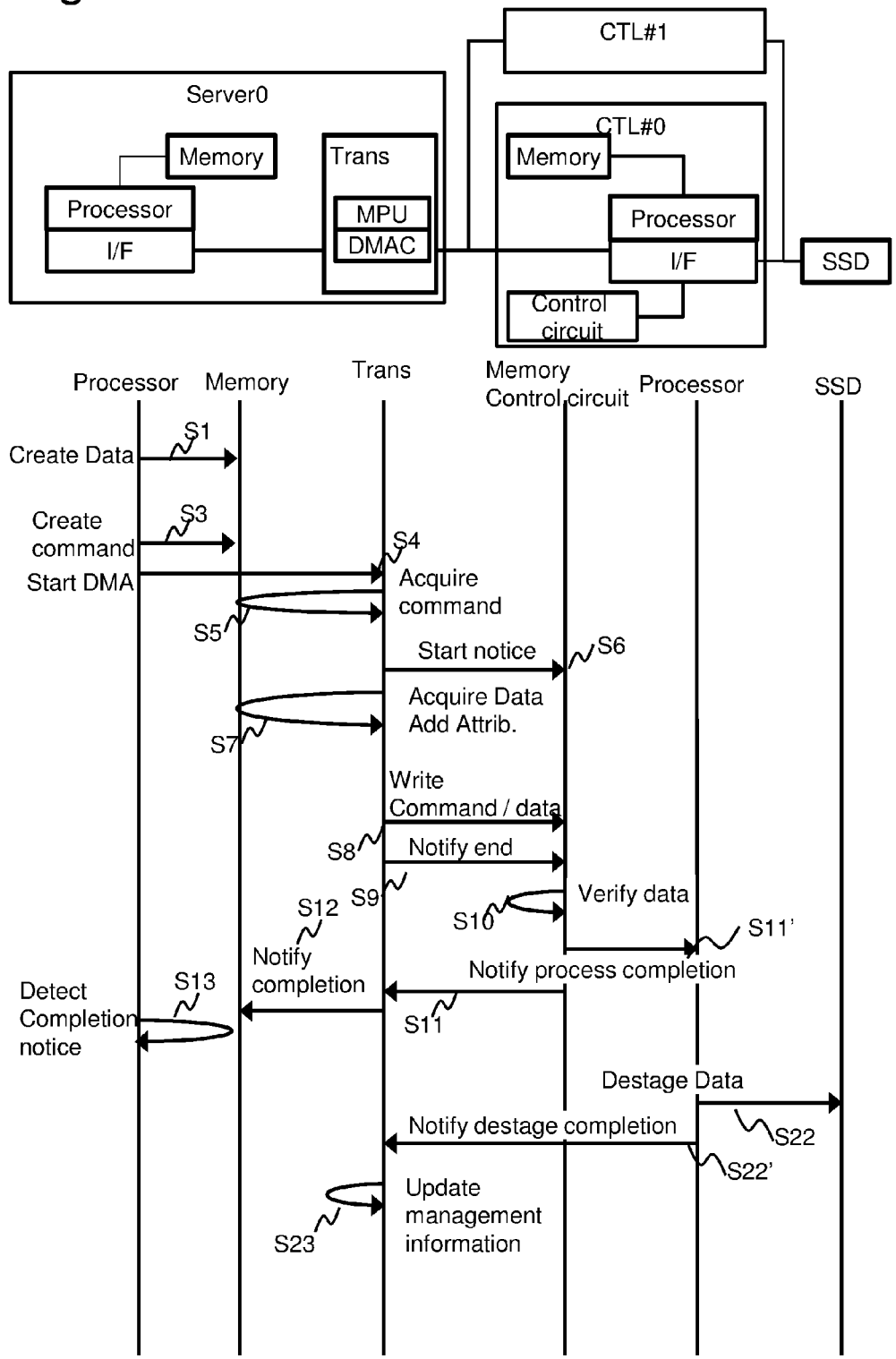
FIG. 2 is an explanatory view illustrating the overall flow of I/O processing.

With reference to FIG. 2, we will describe the flow of the process performed in the respective components when the server 3 writes data to the volume of the storage subsystem 2 using the high-speed write function. At first, the processor 31 in the server 3 creates the data to be written to the volume by executing a DBMS or other programs, and stores the same in the memory 32 (S1). At this time, the LBA of the data write destination volume is also determined. Next, the processor 31 creates a command for storing the data created in S1 to the volume, and stores the same in the memory 32 (S3).

When S3 is completed, the processor 31 issues a data transfer instruction to the transfer module 34 (S4). Specifically, data transfer using the DMAC 342 is started by storing a command instructing to start data transfer into the resister provided in the DMAC 342.

In S5, the transfer module 34 retrieves a command (created in S3) from the memory 32. Here, the transfer module 34 judges whether the retrieved command is a command instructing to execute the write processing using the high-speed write function, or a normal command (conventional write command or read command). In the following description, we will only describe the case where the retrieved command is a command instructing to execute the write processing using the high-speed write function (hereafter, this command is called a "high-speed write command").

In S5, the transfer module 34 performs processes such as determining the storage destination address of the data. As mentioned earlier, the write target data to be written to the volume is temporarily written to the memory 212 (cache area) of the storage subsystem 2 before being stored in the drive 22. At this time, according to the computer system of Embodiment 1, the transfer module 34 determines the data storage destination (address in the cache area). The details of S5 will be described later.

In S6, the transfer module 34 notifies the control circuit 213 of the storage subsystem 2 that data transfer to the storage subsystem 2 from the server 3 will be started.

Next, the transfer module 34 reads data from the memory 32 and adds an Attribute to the data (S7). In the present embodiment, an Attribute is information including an error-correcting code such as a CRC calculated based on data read from the memory 32, and/or a data write destination address (volume LBA) and the like. This information is used to check the data (write data or read data) integrity communicated between the server 3 and the storage subsystem 2. One example of the format of the Attribute is DIF (Data Integrity Field) defined by ANSI T10. When data having an Attribute added thereto is transmitted to the storage subsystem 2, the storage subsystem 2 refers to this Attribute, and verifies whether there is any error in the content of data. The Attribute adding process in the server 3 or the data verification (process of S10 described later) using the Attribute in the storage subsystem 2 are not indispensable processes.

Next, the transfer module 34 uses the DMAC 342 to write the data having a command (received in S5) and the Attribute added thereto to the cache area of the storage subsystem (S8). In the present process, the data is written to the address determined in S5. The storage subsystem 2 is not involved with the determination of the data write destination (address). Further, the transfer module 34 can write data to both the cache area of the CTL #0 and the cache area of the CTL #1 to prepare for a case where one of the controllers 21 stops due to failure and the like.

When S8 is ended, the transfer module 34 sends a notice that data transfer has been completed to the control circuit 213 of the storage subsystem 2 (S9).

When the control circuit 213 receives the notice of S9, it verifies the data written to the cache area in S8 (S10). Actually, the control circuit 213 computes the CRC from the data, and judges whether it corresponds to the CRC included in the Attribute or not. If they correspond, it can be determined that error is not included. Further, the control circuit 213 judges whether the address information included in the Attribute corresponds to the address information included in the command. If they correspond, it can be determined that error is not included.

If it is determined that error is not included, the control circuit 213 notifies the transfer module 34 that the write processing has ended correctly (S11). If it is determined that error is included, in S11, the control circuit 213 returns an error to the transfer module 34. This notice is performed by having the control circuit 213 write information to a status-storing queue (described later) in the transfer module 34. Further at this time, the control circuit 213 notifies the processor 211 in the storage subsystem 2 that the write processing from the server 3 has been completed (S11').

When the transfer module 34 receives a write processing completion notice, the transfer module 34 stores information that transfer has been completed to the memory 32 (S12). The processor 31 periodically refers to the contents of the memory 32, and when it determines that transfer to the memory 32 has been completed (S13), it notifies the program having instructed issuing the write command (high-speed write command) that the write processing has been completed.

In S12, it is also possible to notify that the write processing has been completed by having the transfer module 34 send an interrupt to the processor 31. Further, when the computer system 1 is configured to write data to two CTLs 21 (in S8) (when data is mirror-written), it is possible to execute S12 at the point of time when a process completion notice (S11) has been received from one of the CTLs 21. However, as another embodiment, S12 may be executed after the process completion notice has been received from both the CTL #0 (21-0) and the CTL #1 (21-1).

The storage subsystem 2 performs the destage processing (S22) after the data write from the server 3 to the cache area has been completed. The destage processing can be started at a timing when a notice is sent from the control circuit 213 (S11), or can be executed periodically by the processor 211. In the destage processing, data is stored to the LBA in the volume (drive 22) designated by the command. Further, when the address space of the volume provided by the storage subsystem 2 to the server 3 differs from the address space of the drive 22, it performs address conversion during the destage processing. These processes are well known, so that detailed descriptions thereof are omitted.

When destaging is completed, the processor 211 notifies the transfer module 34 that destaging has been completed (S22'). This notice is performed by the processor 211 writing information to the status storage queue (described later) of the transfer module 34. When the transfer module 34 receives this notice, it updates the management information of the cache area managed by the transfer module 34 (S23). The details of this process will be described later. As described, according to the computer system of the present embodiment, the server recognizes the usages of the cache area in the storage by receiving the notice related to the completion of destaging from the storage in charge of destaging the data stored in the cache. Therefore, when performing the write processing, the server can store the data directly to the storage-side cache.

Further, if the computer system 1 is configured to write data into two CTLs 21 (in S8) (when data is mirrored), it is possible to have one of the CTLs 21 (such as the CTL #0) determined in advance perform the destaging process. In that case, for example, after completing destaging, the CTL #0 (21-0) having performed the destaging process notifies the other CTL #1 (21-1) via the inter-controller communication path that destaging has been completed.

As described, according to the write processing performed via the high-speed write function, data is written to the address determined by the transfer module 34 of the server 3. Then, since the storage subsystem 2 is not required to be involved in determining the write destination (address) of data, the server 3 can store the write data to the storage subsystem 2 at high speed, and the latency of the write processing can be shortened.

Figure 3:
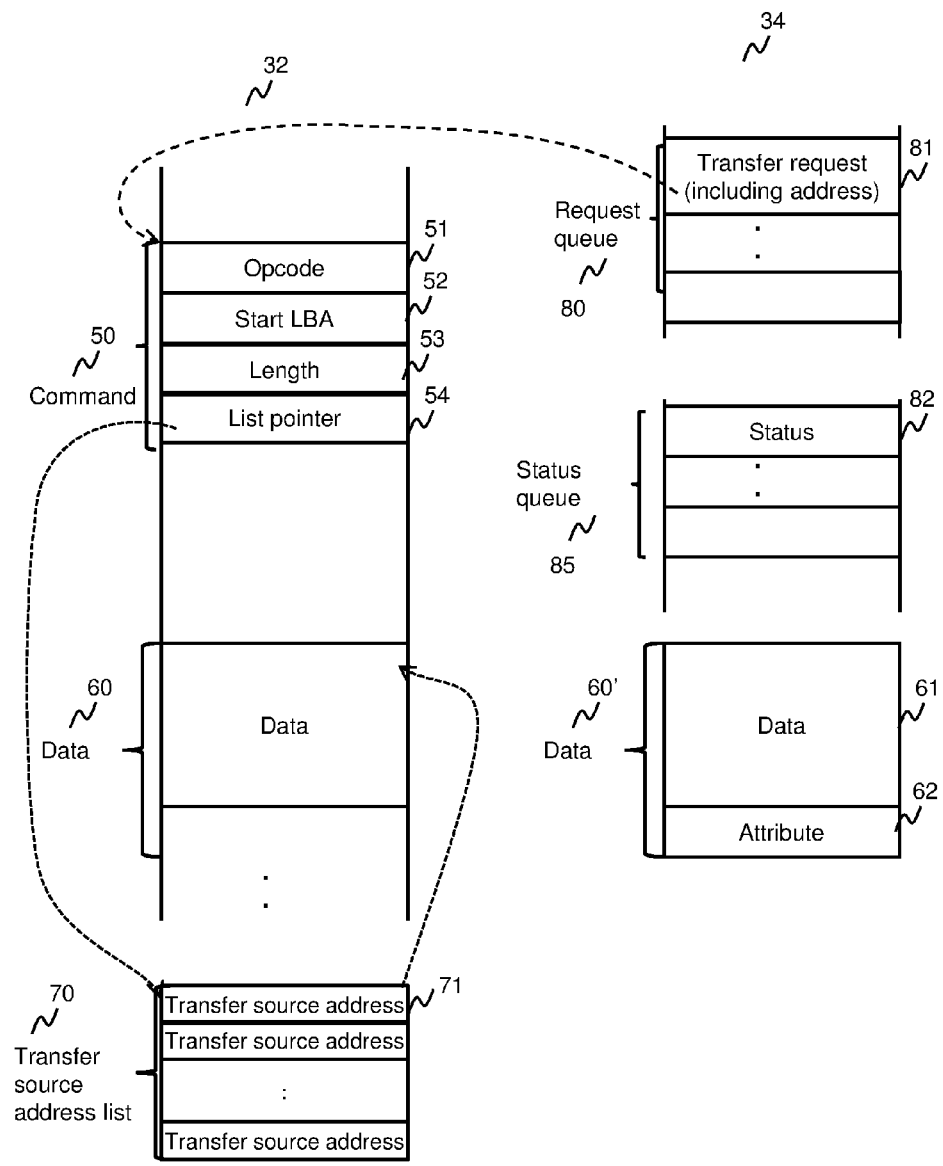
FIG. 3 is an example of a command format.

Next, the example of the format of a command created by the server 3 when the write processing is performed by the high-speed write function will be described with reference to FIG. 3. In FIG. 3, a command 50 is an example of the command created by the server 3. The command 50 is created in the memory 32. The command 50 includes an operation code (Opcode) 51, a start LBA 52, a data length (Length) 53, and a list pointer 54.

In the operation code (Opcode) 51, information indicating the command type is stored. The command type includes, for example, a read command, a write command (conventional read command or write command), a high-speed write command, and so on. The start LBA 52 is the volume address of the access target data. For example, in the case of a write command or a high-speed write command, the volume address (LBA) storing the write target data is designated. Further, when the storage subsystem 2 is configured to provide multiple volumes, the start LBA 52 includes, in addition to the address in the volume, the information for specifying the volume (such as a logical unit number (LUN) and the like).

The length of the write target data is stored in the data length (Length) 53. Further, when the command is created, the processor 31 creates a transfer source address list 70 (described later), and stores the same in the memory 32. A start address (in the memory 32) in which the transfer source address list 70 is located is stored in the list pointer 54. The transfer source address list 70 is composed of a set of addresses (transfer source address 71) in the memory 32 to which the write target data is stored.

Next, we will describe the method for transmitting the write data to the storage subsystem 2 according to the transfer module 34. In the following description, the processing performed based on the high-speed write command will mainly be described. The transfer module 34 has a request queue 80 and a status queue 85. The request queue 80 is an area (a kind of resisters) for storing the data transfer request (command) from the DMAC 342. When the processor 31 creates a command 50 and then instructs the transfer module 34 to transfer the write data to the storage subsystem 2 (FIG. 2, S4), a transfer request 81 is written to the request queue 80. The address in the memory where the command 50 is stored is included in the transfer request. When the transfer request 81 is written to the request queue 80, the transfer module 34 refers to the address included in the transfer request 81, and reads the command 50 into the transfer module 34 (FIG. 2, S5). The command 50 having been read is temporarily stored in the memory 343. The command 50 can also be stored in a dedicated area (resister) provided within the DMAC 342, instead of the memory 343. The status queue 85 is a status-storing queue described earlier, in which the response from the storage subsystem 2 (such as the information stating that the write processing has been performed normally) is stored.

Now, if the type of the retrieved command 50 is the high-speed write command (which is identified by referring to the Opcode 51), the transfer module 34 refers to the list pointer 54 of the retrieved command 50 to specify the address in the memory 32 storing the transfer source address list 70, and reads the transfer source address list 70 from the specified address. Moreover, the transfer module 34 reads the data 60 in the memory 343 based on the contents of the transfer source address list 70 having been read. After reading the data 60 into the memory 343, or during the process of reading the data 60 into the memory 343, the MPU 341 creates an Attribute to be added to the data 60, and creates in the memory 343 the data 60' to which the Attribute 62 has been added.

After creating the data 60' to which the Attribute 62 has been added, the transfer module 34 uses the DMAC 342 to write the command 50 and the data 60' stored in the memory 343 to the memory 212 of the storage subsystem 2. The form of storage of the command 50 and the data 60' in the memory 212 will be described with reference to FIGS. 4 and 5.

Figure 4:
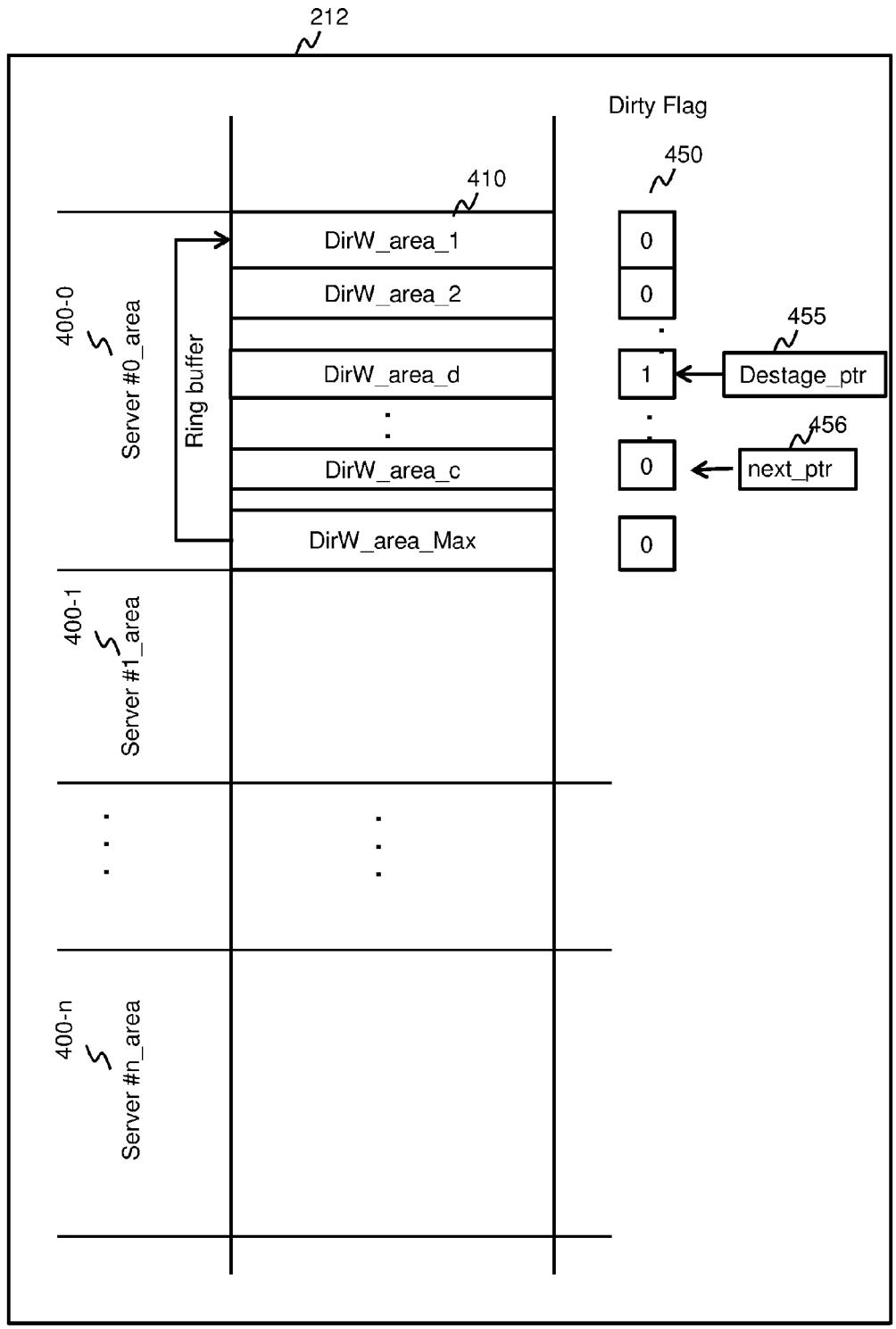
FIG. 4 is an explanatory view of a cache area.

An area for storing the data written from the server 3 using the high-speed write function is secured on the memory 212 (cache area) in advance. Since the storage subsystem 2 is connected to multiple servers 3, areas for the respective servers 3 (400-0, 400-1, . . . 400-n) are secured. FIG. 4 is an example of a case where (n+1) servers 3 are connected.

According to the computer system 1 of Embodiment 1, the maximum size of the information (command and data) to be transferred when the server 3 issues a high-speed write command is determined. In the present embodiment, this maximum size is assumed to be TSZ bytes (TSZ is a positive integer). Further, the areas of the respective servers (areas 400-0, 400-1, . . . 400-n) each have a size capable of storing a Max number (Max is also a positive integer) of small areas of TSZ bytes (that is, TSZ×Max bytes). In other words, a Max number of sets of commands and data can be stored in the area for the respective servers. In FIG. 4, the areas for the respective servers, such as area 400-0 and area 400-1, are illustrated as contiguous region, but it is not always necessary that the areas for the respective servers are disposed adjacently. However, the area for one server must be a contiguous region.

The addresses and sizes (the number of storable commands and data) of the areas for the servers (areas 400-0, 400-1, . . . 400-n) can be determined statically in advance, or can be determined dynamically. If these addresses and sizes are determined statically in advance, the server 3 recognizes the extent of the areas for the servers (such as the start address and size) in advance, and is configured to store commands and data to that area at all times.

On the other hand, these addresses and sizes can be determined dynamically. In that case, by performing negotiation between the server 3 and the storage subsystem 2 at the time of initialization and the like (such as when starting the server 3 or when the storage subsystem 2 is connected to the server 3), the start address and size of the area for the server is determined. Then, the server 3 stores the command and data to the area for the server based on the determined start address and size. The specific method for determining the start address and size of the server area (area for storing commands and data) by performing negotiation between the server 3 and the storage subsystem 2 will be described in Embodiment 3.

Figure 5:
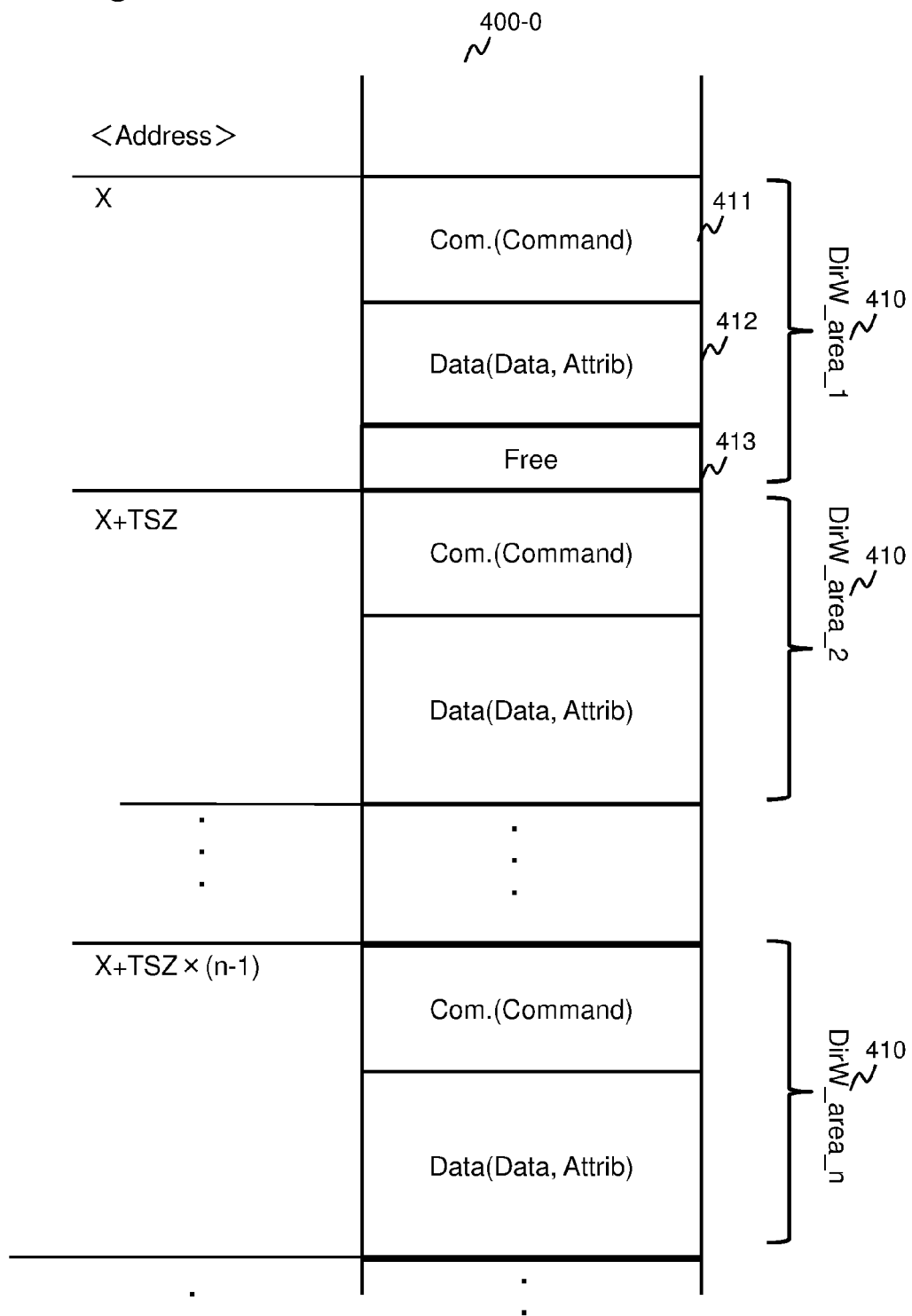
FIG. 5 is a storage example of command and data.

FIG. 5 illustrates an example of a state where multiple sets of commands and data are stored in an area for server (such as area 400-0). In the example of FIG. 5, the start address of area 400-0 is X. When the server 3 stores the set of a command and data to the storage subsystem 2 for the first time, the transfer module 34 writes a command 411 and data 412 to a contiguous area starting from address X. At the timing of the next write, the transfer module 34 stores the command 411 and the data 412 to the contiguous area starting from address X+TSZ. Then, during the n-th write operation, the transfer module 34 stores the command and data to the contiguous area starting from address X+TSZ× (n−1). In the following description, the area having size TSZ starting from the beginning of the area for the server (set as address X) is called DirW_area_1. The area having size TSZ starting from the address (X+TSZ×(n−1)) of the area for the server is called DirW_area_n (where n is an integer equal to or greater than, and the maximum value thereof is Max).

During the (Max+1)-th write, the transfer module 34 stores the command and data to the beginning of area 400-0, that is, the contiguous area starting from address X (DirW_area_1). In other words, the computer system uses the area for the server as a ring buffer. However, at this time, when the data stored in DirW_area_1 (that is, the data written by the initial write operation) is not destaged to the drive 22, it is not possible to write the command and data to this area. Therefore, when writing the command and data to this area, the transfer module 34 checks whether the data stored in this area has already been destaged or not. Only when the data is destaged, the command and data is written to this area. The actual methods are described below.

The transfer module 34 stores information for managing the usage of the areas for the servers. These information are described with reference to FIG. 6. The transfer module 34 stores information called Dir_area_count (3431), Destage_count (3432) and Empty_flag_bitmap (3433) in the memory 343 as information for managing the usages of the area for the servers. A value which is equal to or greater than 1 and equal to or smaller than Max is stored in Dir_area_count (3431) and Destage_count (3432). Further, Max is set as the initial value of Dir_area_count (3431) and the Destage_count (3432).

In the Dir_area_count (3431), information for specifying the area where data has been written by the high-speed write processing performed at the last time is stored. For example, if the Dir_area_count (3431) is n, it shows that data has been written to the DirW_area_n by the high-speed write processing performed immediately in advance.

In the Destage_count (3432), information for specifying the area where destaging has been performed most recently by the storage subsystem 2 is stored. For example, when the Destage_count (3432) is n, it indicates that the data stored in DirW_area_n had been destaged by the most recently performed destage processing.

An Empty_flag_bitmap (3433) is an area having a Max bit size. Information indicating whether the DirW_area is has been destaged or not is stored in each bit. If the n-th bit of the Empty_flag_bitmap (3433) is 1, it indicates that the DirW_area_n is already destaged. Therefore, if the n-th bit of the Empty_flag_bitmap (3433) is 1, the server 3 can write data to the DirW_area_n. In contrast, if the n-th bit of the Empty_flag_bitmap (3433) is 0, it means that the data stored in DirW_area_n has not yet been destaged. In the following description, the n-th bit of the Empty_flag_bitmap (3433) is denoted as empty[n]. In the initial state, all the bits of the Empty_flag_bitmap (3433) are set to 1.

Further, the storage subsystem 2 also has information for managing the usages of the area for the server. With reference again to FIG. 4, the information for managing the usages of the area for the server managed by the storage subsystem 2 will be described. The storage subsystem 2 has information called a Dirty Flag 450, a Destage pointer (Destage ptr) 455, and a next_ptr 456 stored in the memory 212.

The Dirty Flag 450 is information similar to the Empty_flag_bitmap (3433), which is an area having a Max bit size. In each bit, information indicating whether the DirW_area has already been destaged or not is stored. When the n-th bit of the Dirty Flag 450 is 0, it means that the DirW_area_n has already been destaged. If the DirW_area_n is in the state that destaging has been done, the state of the DirW_area_n is expressed as "clean" state.

On the contrary, if the n-th bit of the Dirty Flag 450 is 1, it means that the data stored in the DirW_area_n has not yet been destaged. If the data stored in the DirW_area_n is not yet destaged, the state of the DirW_area_n is expressed as "dirty" state. In the initial state, all the bits of the Dirty Flag 450 are set to 0. In the following, the n-th bit of the Dirty Flag 450 is denoted as Dirty[n].

The Destage pointer 455 is information for specifying the area to be destaged when the storage subsystem 2 performs the destage processing. A value equal to or greater than 1 and equal to or smaller than Max is stored in the Destage pointer 455. When the value of the Destage pointer 455 is n, the storage subsystem 2 performs destaging of DirW_area_n. After destaging DirW_area_n, 1 is added to the Destage pointer 455.

The next_ptr 456 is information used by the server 3 for specifying the area for writing data when the server 3 performs data write using the high-speed write command for the next time. Similar to the Destage pointer 455, a value equal to or greater than 1 and equal to or smaller than Max is stored in the next_ptr 456. If the value of the next_ptr 456 is n, the server 3 writes data to the DirW_area_n. After data write from the server 3 has been performed, 1 is added to the next_ptr 456. In the initial state, 1 is set as the Destage pointer 455 and the next_ptr 456.

In FIG. 4, only the Dirty Flag 450, the Destage pointer 455 and the next_ptr 456 associated with Server #0_area are illustrated out of the multiple areas for servers. However, in reality, the Dirty Flag 450, the Destage pointer 455 and the next_ptr 456 are provided for the respective areas for servers. Therefore, if k areas for servers (Server #0_area to Server #(k−1)_area) are provided, k sets of the Dirty Flag 450, the Destage pointer 455 and the next_ptr 456 exist in the memory 212.

Figure 7:
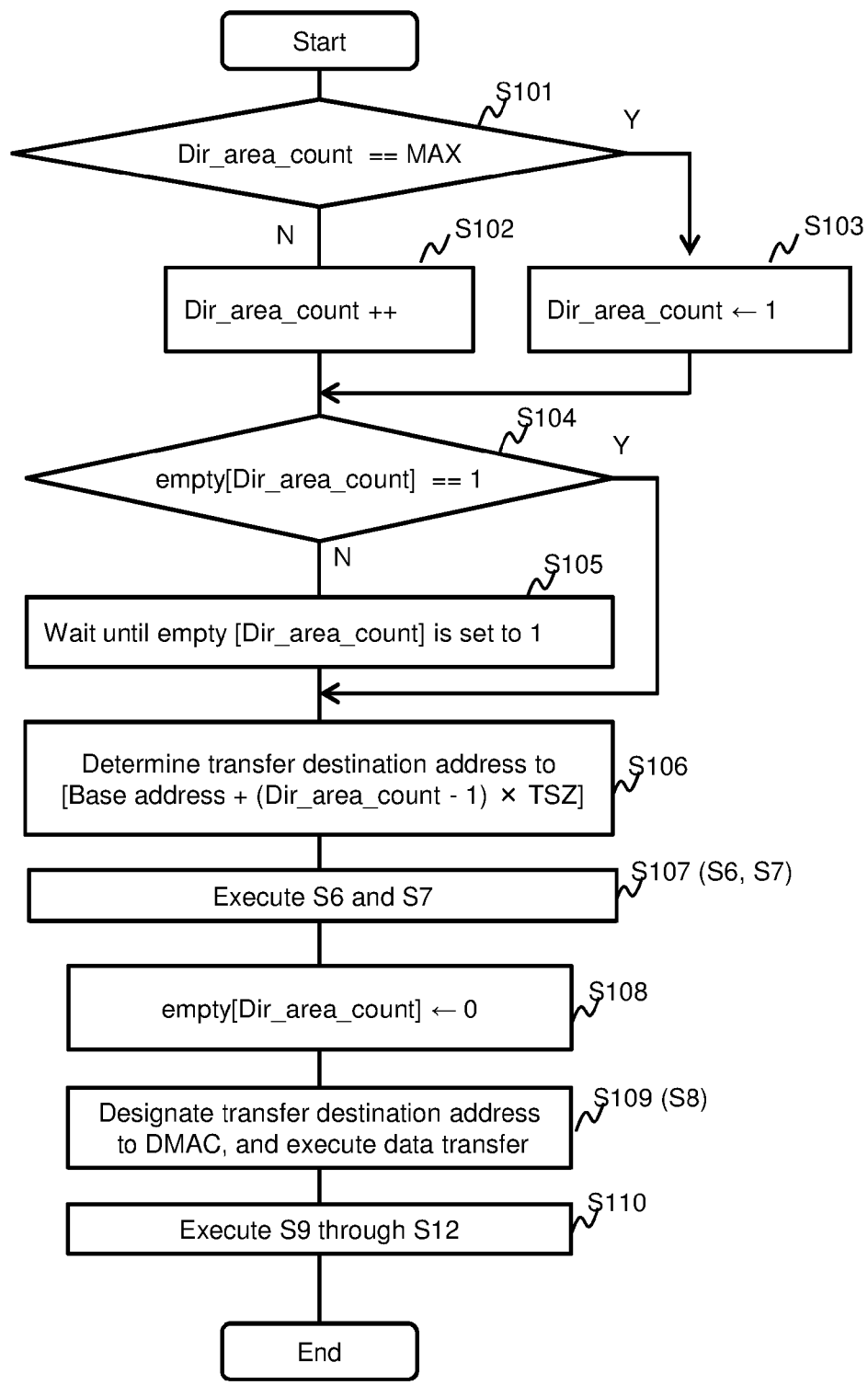
FIG. 7 is a flowchart of a process executed by a transfer module.

Next, the details of the processing executed by the transfer module 34 when the write processing by the high-speed write function is performed will be described with reference to FIGS. 7 and 8. FIG. 7 is a process flow mainly corresponding to S5 through S12 of FIG. 2. In the following description, a case is described where the transfer module 34 of the server 3 writes data in the area within Server #0_area (400-0). Further, a case is described where the start address (base address) of Server #0_area (400-0) is X.

Further, in the flowcharts of FIG. 7 and the like, the expression where the left side and the right side of the expression is connected via "=" mean that the process judges whether the value on the left side and the value on the right side are equal or not. The expression where the left side and the right side are connected via "←" means that the process substitutes the value on the right side to the left side.

When the transfer module 34 receives a data transfer instruction from the processor 31, the transfer module 34 first judges whether the Dir_area_count is equal to Max or not (S101). If they are equal, the transfer module 34 changes the value of Dir_area_count to 1 (S103). If they are not equal, the transfer module 34 adds 1 to Dir_area_count (S102).

Thereafter, the transfer module 34 judges whether empty[Dir_area_count] is 1 or not (S104). If empty[Dir_area_count] is not 1 (S104: N), it means that not-yet-destaged data is stored in the write target area. Therefore, the transfer module 34 waits until empty[Dir_area_count] is changed to 1 (S105). If empty[Dir_area_count] is 1, the transfer module 34 executes the processes of S106 and thereafter.

In the judgement of S104, if empty[Dir_area_count] is not 1, instead of waiting for the empty[Dir_area_count] to turn to 1, the transfer module 34 can notify the processor 31 that data write cannot be performed since the storage subsystem 2 is in a busy state.

In S106, the transfer module 34 determines the storage destination address of data. The storage destination address of data is calculated by computing "base address (X)+(Dir_area_count−1)×TSZ".

In S107, the transfer module 34 executes the processes of S6 and S7 of FIG. 2. Detailed description of S6 and S7 will be omitted. In S108, the transfer module 34 sets 0 to empty[Dir_area_count].

Next, the transfer module 34 performs the process of S8 in FIG. 2, that is, performs data write using the DMAC 342 (S109). Here, the transfer module 34 instructs the DMAC 342 to write data (data having command and Attribute added thereto) to the contiguous area having the address determined in S106 as the start address.

Thereafter, the transfer module 34 executes the processes of S9 through S12 of FIG. 2 (S110). That is, the transfer module 34 notifies the completion of data transfer (write) to the control circuit 213, and waits for a response to be returned from the control circuit 213. When a response from the control circuit 213 is received, the transfer module 34 writes information stating that the processing of the high-speed write command has been completed to the memory 32, and ends the process.

Next, with reference to FIG. 8, the process executed by the transfer module 34 in S23 of FIG. 2 will be described. At first, the transfer module 34 judges whether Destage_count is equal to Max or not (S201). If it is equal, the transfer module 34 changes the value of Destage_count to 1 (S203). If it is not equal, the transfer module 34 adds 1 to the Destage_count (S202).

Thereafter, the transfer module 34 stores 1 in empty [Destage_count] (S205), and ends the process. Therefore, at the timing of receiving the notice that destaging has been completed from the storage subsystem, the transfer module 34 changes the empty[Destage_count] to 1, and performs management so that the cache area specified by the Destage_count is in a data writable state.

Figure 9:
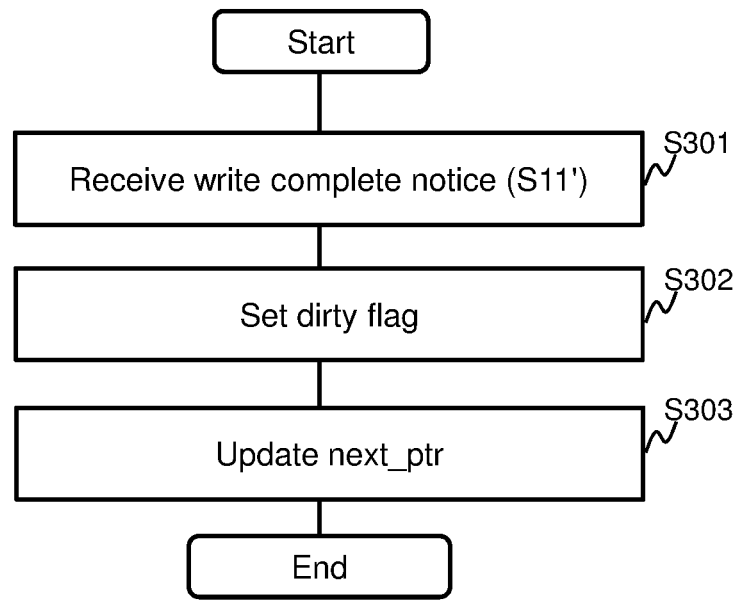
FIG. 9 is a flowchart of a process executed by a storage subsystem.
Figure 10:
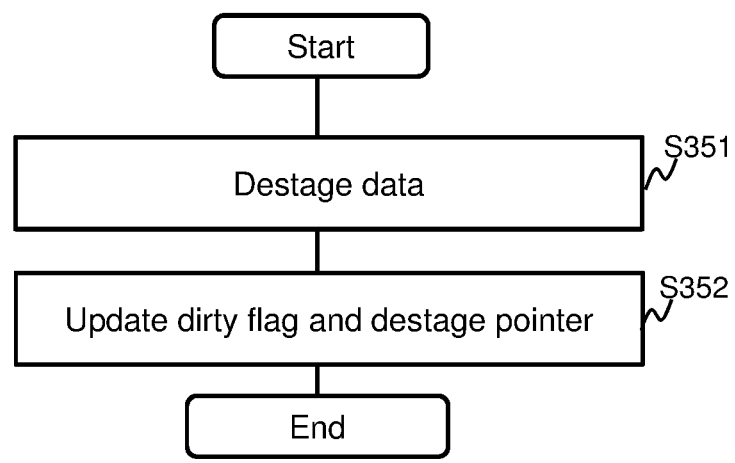
FIG. 10 is a flowchart of a management information update processing performed after a destage processing.

Next, the flow of the process performed in the storage subsystem 2 will be described with reference to FIGS. 9 and 10. FIG. 9 illustrates the flow of the process performed at the timing of S11' of FIG. 2, that is, the process that the storage subsystem 2 performs when the data write from the server 3 to the cache area ends.

When the processor 211 receives a notice from the control circuit 213 stating that the write processing from the server 3 has been completed (S301), the processor 211 updates the Dirty Flag 450 (S302). Specifically, the processor 211 stores 1 in Dirty[next_ptr]. The notice received in S301 includes information (such as the server number) capable of specifying the area for the server to which the server 3 has written data. Based on this information, the processor 211 specifies the update target Dirty Flag 450 (and the Destage pointer 455 and the next_ptr 456).

Thereafter, the processor 211 updates the value of next_ptr (S303), and ends the process. The way of the update of the value is similar to the update of the Dir_area_count, that is, when next_ptr is equal to MAX, the value of next_ptr is set to 1. If next_ptr is not equal to MAX, 1 is added to next_ptr.

Next, the update processing of management information performed after the destage processing will be described with reference to FIG. 10. FIG. 10 illustrates the flow of the update processing of the Dirty Flag 450 and the Destage pointer 455 performed when executing S22 of FIG. 2. Now, we will describe the process executed when the storage subsystem 2 periodically performs the destage processing. Further, in the destage processing executed by the storage subsystem 2, destaging of data stored in one DirW_area is performed in a single destage processing.

In S351, the processor 211 destages the data in the cache area to the drive 22. During destaging, the processor 211 refers to the Destage pointer 455, and performs destaging of the area specified by the Destage pointer 455. For example, if the value of the Destage pointer 455 is n, the data stored in the DirW_area_n is destaged.

When destaging is completed, the processor 211 updates the Dirty Flag 450 and updates the Destage pointer 455 (S352). Specifically, the processor 211 stores 0 in Dirty [destage pointer]. Further, the update of the Destage pointer 455 is performed in a similar method as the update of the next_ptr. Therefore, if the value of the Destage pointer 455 is equal to MAX, the value of the Destage pointer 455 is set to 1, and if not, 1 is added to the Destage pointer 455. In the case of the storage subsystem 2 according to Embodiment 1, when the update of the Dirty Flag 450 and the Destage pointer 455 are completed, the update processing of management information is completed. When the server 3 is configured to write data to the two controllers 21 of the storage subsystem 2, the processor 211 instructs the other controller 21 to update the Dirty Flag 450 and the Destage pointer 455. The controller 21 having received the instruction performs a similar process as FIG. 10.

As described, according to the computer system of Embodiment 1, when performing the write processing (write processing based on high-speed write function), the data write position in the cache area is determined by the transfer module 34 of the server 3, and the transfer module 34 directly writes data to the determined address. The storage subsystem 2 is not required to perform processes such as the determination of storage position of data. Therefore, the server 3 can store the write data at high speed to the storage subsystem 2, and the latency of the write process can be reduced. The present invention is suitable for the uses in, such as the log write processing of DBMS, the process that the I/O characteristics is mainly the write access and a low access latency is required.

If the program (such as DBMS) executed by the server 3 uses the high-speed write function, high speed writing becomes possible by the program creating the high-speed write command mentioned above (command having the format described above) and instructing the same to the transfer module 34. Of course, instead of having the application program such as DBMS create the high-speed write command, it is possible to provide the function to create a high-speed write command to a lower-level program such as a device driver, and to have the application program such as DBMS call the lower-level program for creating the high-speed write command.

However, the method for having the program use the high-speed write function is not restricted to the method described above, and various other methods can be considered. Any arbitrary method can be adopted as long as the method enables to notify the transfer module 34 that the program requires data to be written by the high-speed write function. According to Embodiment 1 described earlier, the method for determining whether data write by the high-speed write function is required by the server 3 or not based on the contents of the Opcode 51 by the transfer module 34 has been described, but other determination methods are also possible. For example, the start LBA 52 and the like can be used for the determination. That is, it is possible that the transfer module 34 executes the data write by the high-speed write function if the area specified by the start LBA 52 and the data length 53 in the command belongs to the predetermined address range.

In this case, information related to the given address range is registered in advance to the transfer module 34. We will suppose that the start address of this address range is a and the end address thereof is b. When the transfer module 34 reads this command (it is not necessary that this command is designated as a high-speed write command in the Opcode 51, and it can be a conventional write command), if the address range of the area specified by the start LBA 52 and the data length 53 is between a and b, the transfer module 34 should execute the write using the high-speed write function.

When adopting this method, there is no need to provide to the program a function to create a high-speed write command (there is no need to modify the program). For example, when a high-speed write function is used to perform a log write processing of DBMS, if the address range of the area for log write (Log Disk) is registered in advance to the transfer module 34, the transfer module 34 will operate to process the write request to the log write area using the high-speed write function. According to the present configuration, it becomes possible to realize data write to the storage at high speed regarding the log data required to realize access via a lower latency than normal data, in preparation for failure.

A case where the server 3 issues a high-speed write command is when data write must be completed at a short time. Therefore, the process related to the high-speed write command should preferably be executed with higher priority than the processes related to other commands, so that a means can be provided to the transfer module 34 to process the high-speed write command with priority. For example, multiple (for example, two) request queues 80 are provided. One of the request queues 80 is set as a dedicated queue for storing the high-speed write command, and when the server 3 utilizes the high-speed write function, it writes the transfer request to the dedicated queue. Further, the transfer module 34 is operated so as to process the commands stored in the dedicated queue with higher priority than the commands stored in the other request queue 80. Thus, the process regarding the high-speed write command can be executed with priority even when a large number of commands are issued.

Further, there are cases where data becomes unnecessary after the server 3 writes the data to the volume (drive 22) of the storage subsystem 2. At the point of time when data becomes unnecessary, there is no need to destage the data remaining in the cache area of the storage subsystem 2 (data that is not yet subjected to destaging). When the server 3 is capable of instructing the storage subsystem 2 to discard the not-yet-destaged data (that can also be referred to as cancelling of destaging), the storage subsystem 2 will not be required to perform additional processes, so the load on the storage subsystem 2 can be further reduced. The storage subsystem 2 can support such instructions (commands).

A processing example of a case where a function to cancel destaging is provided will now be described. When the server 3 determines that the data stored in the volume has become unnecessary, the server 3 creates a command to instruct cancellation of the destaging process (called a destage cancellation command), and transfers the same to the transfer module 34. This process is similar to S3 through S5 of FIG. 2.

When the transfer module 34 receives the destage cancellation command, it initializes the management information that the transfer module 34 has, and simultaneously instructs the control circuit 213 of the storage subsystem 2 to initialize the management information of the storage subsystem 2. The transfer module 34 sets Max as the value of the Dir_area_count (3431) and the Destage_count (3432), and sets 1 to all bits of the Empty_flag_bitmap (3433), to initialize the management information. Further, if an unprocessed transfer request or the like remains in the request queue 80 or the status queue 85, that information is also deleted.

Further, when the control circuit 213 receives an instruction to initialize the management information of the storage subsystem 2 from the transfer module 34, it changes the values of the Destage pointer 455 and the next_ptr 456 to 1. Further, all bits of the Dirty Flag 450 are changed to 0. Thereby, destaging is cancelled.

Embodiment 2

Figure 11:
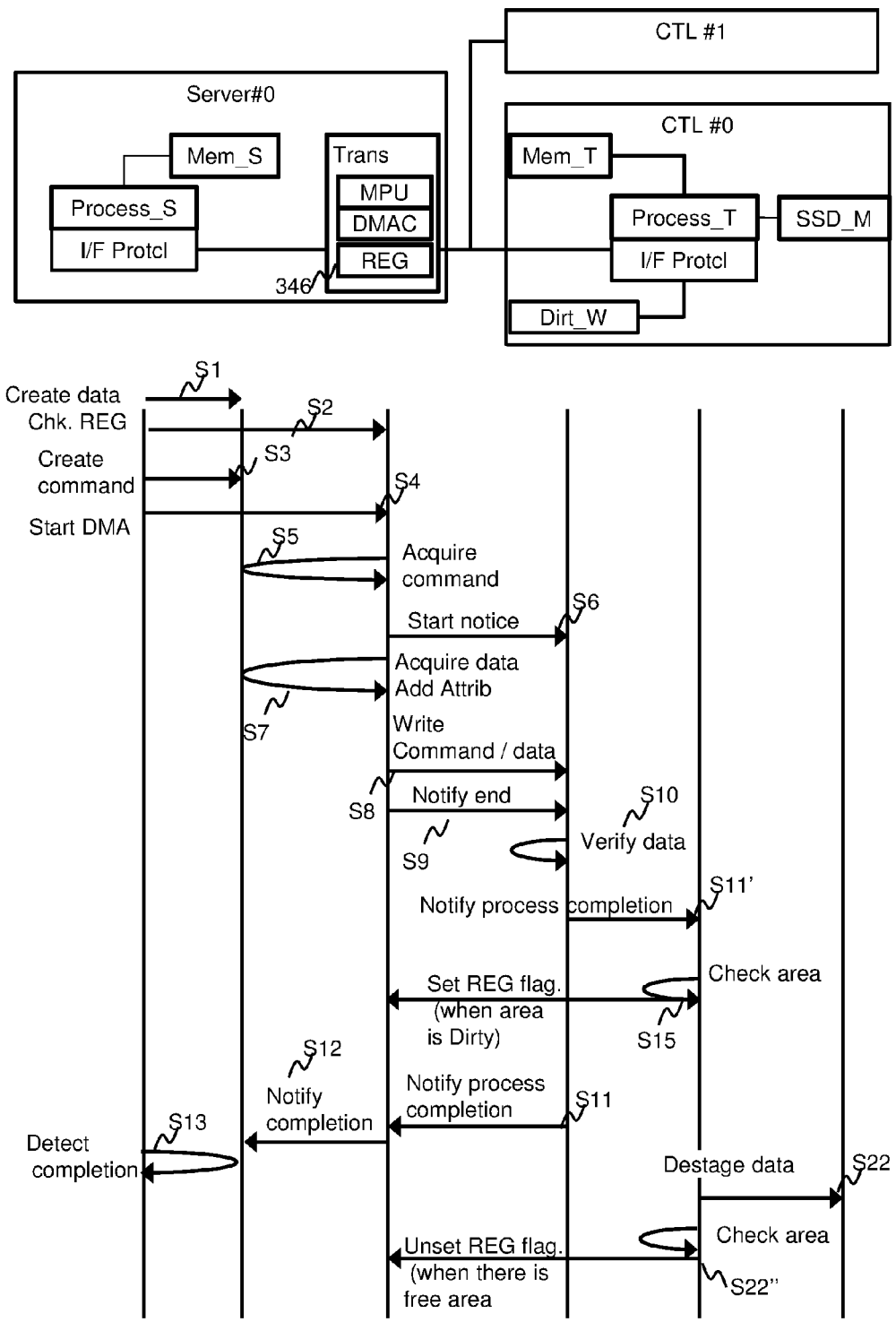
FIG. 11 is an explanatory view of an overall flow of I/O processing in a computer system according to Embodiment 2.

The computer system according to Embodiment 2 somewhat differs from that described in Embodiment 1 regarding the management information that the transfer module 34 has. Other hardware configuration is substantially the same as that described in Embodiment 1, so it will not be illustrated. With reference to FIG. 11, the flow of the process that the computer system according to Embodiment 2 performs in each component when writing data into the volume of the storage subsystem 2 using the high-speed write function will be described. Many parts of the flow of the process illustrated in FIG. 11 are the same in FIG. 2, so that in the following, mainly the differences with FIG. 2 will be described.

According to the computer system of Embodiment 1, the transfer module 34 had judged whether to enable data to be written to the cache area or not using the management information such as the Empty_flag_bitmap (3433). On the other hand, according to the computer system of Embodiment 2, the storage subsystem 2 judges whether to enable data to be written from the server 3 to the cache area, and notifies the judged result to the server 3. However, the determination of the write destination address when the server 3 writes data to the cache area is performed by the transfer module 34, similar to the computer system according to Embodiment 1.

According to the computer system of Embodiment 2, a resister (REG) 346 for notifying whether data write from the server 3 to the cache area is possible or not is disposed in the transfer module 34. Either 0 or 1 is set in the REG 346 by the storage subsystem 2. When 0 is entered, it means that data is writable to the cache area. On the other hand, when 1 is entered, it means that data that is not yet destaged is remaining in the cache area (data is unwritable). The processor 31 of the server 3 checks the value of the REG 346 before issuing the high-speed write command, and judges whether data is writable to the cache area (S2). When it is judged that data is not writable to the cache area, the issuing of the command is suspended.

When data write from the server 3 to the cache area is completed, a notice is sent from the control circuit 213 to the processor 211 of the storage subsystem 2 that the write processing from the server 3 has been completed (S11'). When this notice is received, the processor 211 checks whether a data writable area exists in the cache area or not, and based on the check result, updates the value of the REG 346 (S15). The actual method thereof will be described later.

After the processor 211 executes the destage processing, it re-checks whether a data writable area exists in the cache area or not, and based on the check result, updates the value of the REG 346 (S22"). The actual method thereof will be described later.

Figure 12:
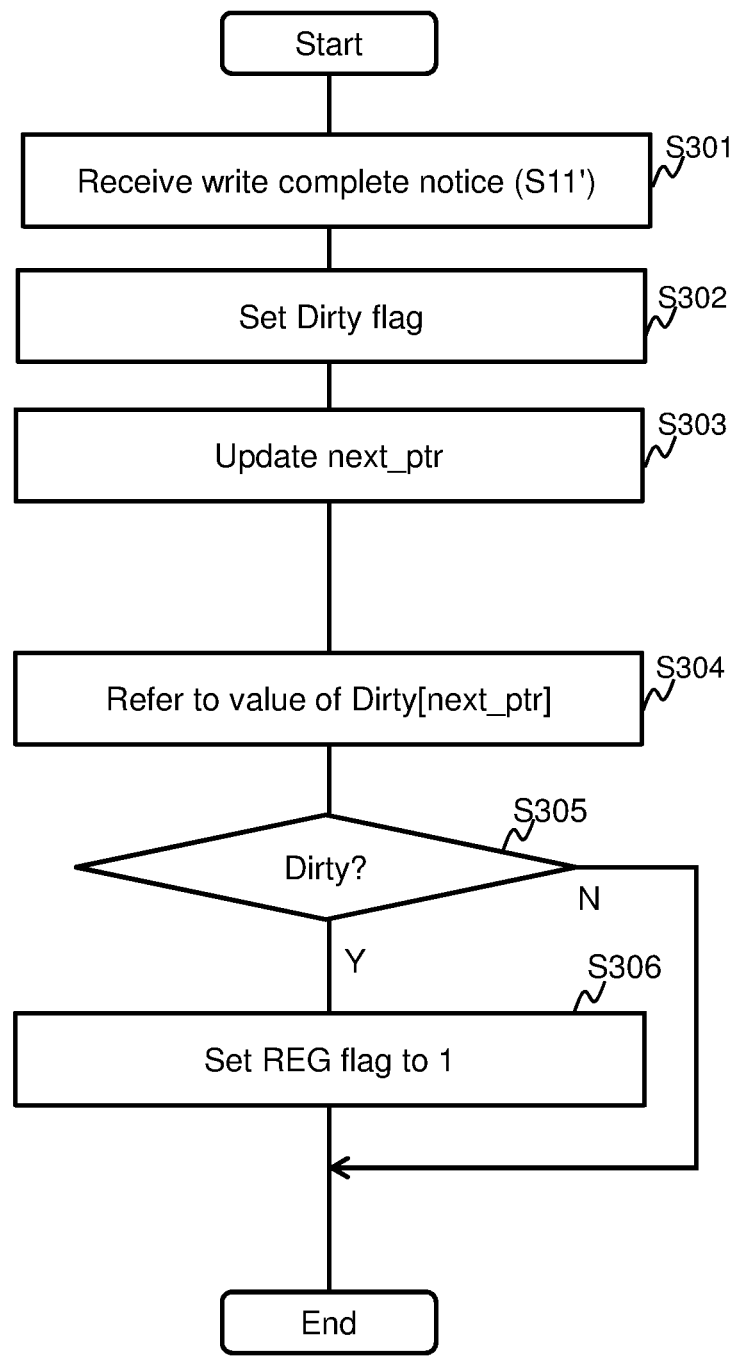
FIG. 12 is a flowchart of a process executed in the storage subsystem.

With reference to FIG. 12, the flow of the process performed in S11' of FIG. 11 will be described. The process described in FIG. 12 is executed by the processor 211 of the storage subsystem. Steps S301 through S303 are the same as those described in Embodiment 1.

After the processor 211 updates the value of the next_ptr (S303), the processor 211 refers to the value of the Dirty[next_ptr] (S304). When Dirty[next_ptr] is 1 (S305: Y), in other words, when the area specified by the next_ptr is in a dirty state, the processor 211 stores 1 in the REG 346 (S306), and ends the process. When Dirty[next_ptr] is 0 (S305: Y), the processor 211 ends the process without changing the value of the REG 346.

In other words, when the server 3 writes data into the DirW_area_n of the cache area, the processor 211 checks whether the data stored in the DirW_area_(n+1) has already been destaged or not. When the server 3 writes data into the DirW_area_n of the cache area, the area into which the server 3 writes data next will be DirW_area_(n+1). Therefore, if the data stored in DirW_area_(n+1) is not already destaged (in a dirty state), the storage subsystem 2 stores 1 in the REG 346 to notify the server 3 that data cannot be written to the cache area.

However, if the data write frequency of the server 3 is significantly high, it may be possible that the server 3 has started the next write processing before the storage subsystem 2 executes the processes of S304 through S306. In that case, the server 3 may write data into the DirW_area_(n+1) even though the DirW_area_(n+1) is in a dirty state. Therefore, in the determination of S304 and S305, the processor 211 may check not only Dirty[next_ptr] but also other multiple areas (such as Dirty[next_ptr+1] through Dirty[next_ptr+5] etc.) to confirm that all the checked areas are in a dirty state. It is also possible to perform operation based on a rule that the server 3 will not issue the next write request until the storage subsystem 2 notifies the transfer module 34 that the write processing has been completed (S11).

Figure 13:
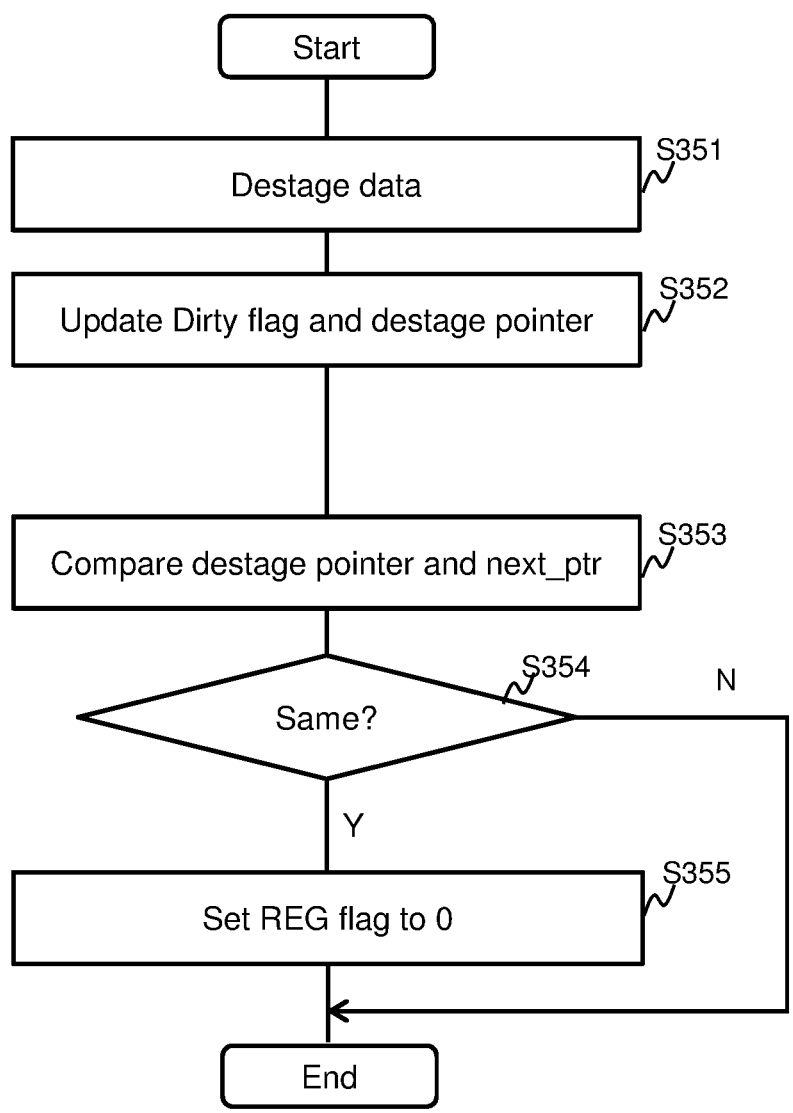
FIG. 13 is a flowchart of a process executed in the storage subsystem.

Next, with reference to FIG. 13, the flow of the processing performed in S22" of FIG. 11 will be described. The process illustrated in FIG. 13 is executed by the processor 211 of the storage subsystem. Steps S351 through S352 are the same as the processes described in Embodiment 1.

In S353, the processor 211 compares the values of the Destage pointer 455 and the next_ptr. If the values of the Destage pointer 455 and the next_ptr are the same (S354: Y), the processor 211 sets the value of the REG 346 to 0 (S355), and ends the process. If the values of the Destage pointer 455 and the next_ptr differ (S354: N), the process is ended without changing the value of the REG 346.

As described, according to the computer system of Embodiment 2, the storage subsystem 2 judges whether data is writable from the server 3 to the cache area. Therefore, in the transfer module 34, it is not necessary to judge whether data is writable. Thus, in the computer system according to Embodiment 2, the transfer module 34 is not required to have the Empty_flag_bitmap (3433). Further, there is no need to refer to or update the Empty_flag_bitmap (3433).

We will now describe the process executed in the transfer module 34 when write processing by the high-speed write function is performed in the computer system according to Embodiment 2. Many of the processes executed in the transfer module 34 of Embodiment 2 are the same as those described in Embodiment 1, so mainly the differences from Embodiment 1 will be described with reference to FIG. 7.

With reference to FIG. 7, the process that the transfer module 34 executes in the process of S5 through S12 of FIG. 11 will be described. The transfer module 34 of Embodiment 2 does not need to refer to and update the Empty_flag_bitmap (3433). Therefore, the transfer module 34 of Embodiment 2 only executes S101 through S103, S106, S107, S109 and S110. It will not perform the processes of S104, S105 and S108.

Embodiment 3

According to the computer system of Embodiment 1 or Embodiment 2, a transfer module 34 is disposed between the processor 31 of the server 3 and the storage subsystem 2. However, the present invention can be implemented in a configuration without a transfer module 34. Embodiment 3 illustrates the configuration of a computer system without a transfer module, and the processing of the high-speed write function in such computer system.

Figure 14:
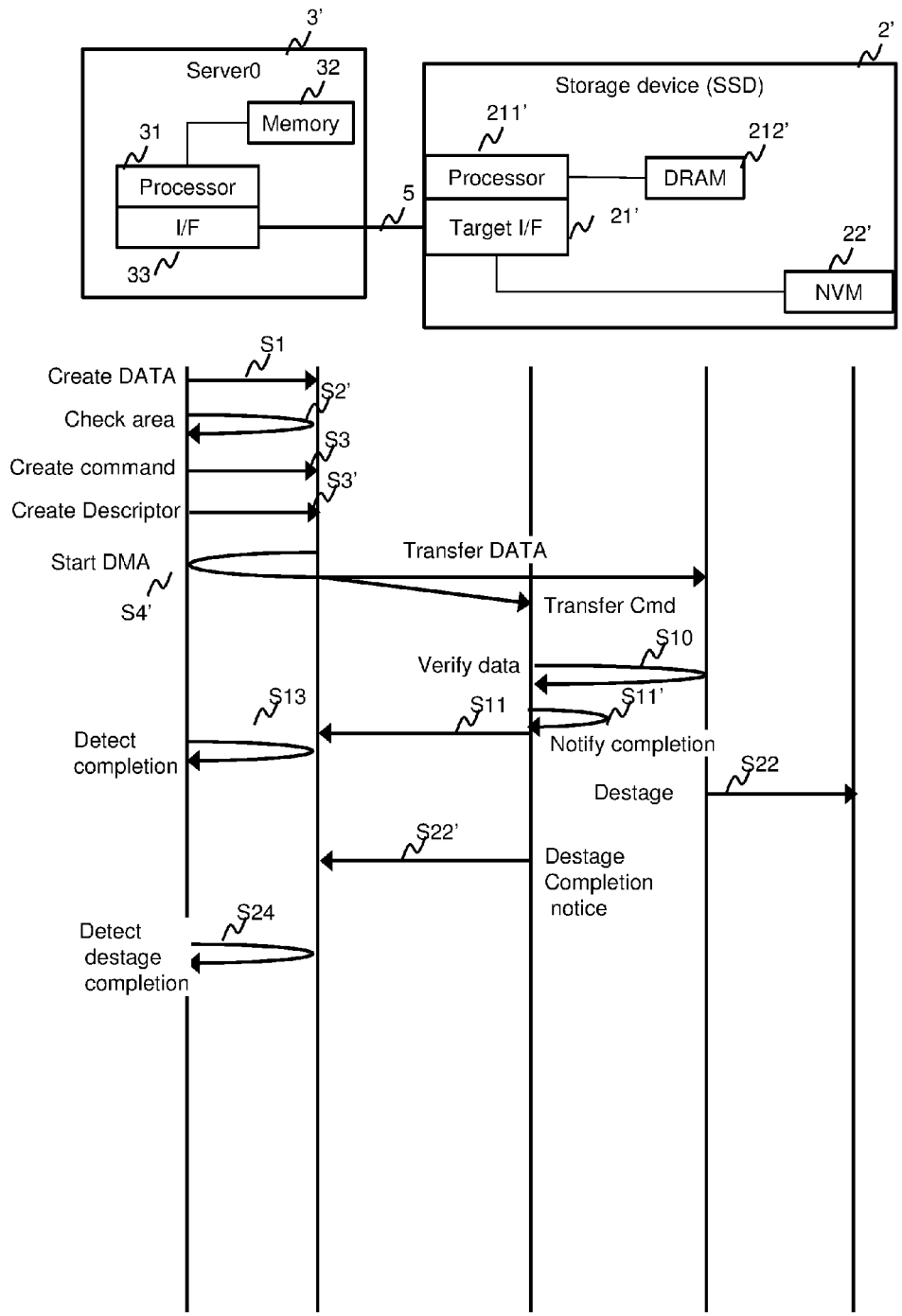
FIG. 14 is an explanatory view of an overall flow of I/O processing in a computer system according to Embodiment 3.

With reference to FIG. 14, the configuration of a computer system according to Embodiment 3 and the flow of the write processing by the high-speed write function performed in the computer system will be described. The computer system according to Embodiment 3 adopts a configuration where a server 3' and a storage device 2' are connected via a communication path 5. The configuration of the server 3' is the same as the server 3 according to Embodiment 1 or Embodiment 2, excluding the point that a transfer module 34 doesn't exist. The communication path 5 is a communication line in compliance with PCIe standards.

The storage device 2' corresponds to the storage subsystem 2 in the computer system according to Embodiments 1 or 2. The storage device 2' has a processor 211', a memory 212', an NVM 22' and a target I/F 21'.

The processor 211' and the memory 212' are each equivalent to the processor 211 and the memory 212 of the storage subsystem 2 described in Embodiments 1 or 2. Similar to the memory 212 of Embodiment 1 and the like, the memory 212' has a cache area for temporarily storing the write data from the server 3'. Further, it can be configured to have a battery for backup, so that the contents stored in the memory 212' can be retained even during power failure and the like (or to enable the data in the memory 212' to be destaged to the NVM 22'). The NVM 22' corresponds to the drive 22 in the storage subsystem 2 of Embodiment 1 and the like. The write data from the server 3' is temporarily stored in the cache area, thereafter, it is finally stored in the NVM 22'. The NVM 22' is a nonvolatile storage module, one example of which is a flash memory chip.

The target I/F 21' has a DMAC (not shown), which is a component for controlling data transfer between the server 3' and the storage device 2'. It further has a function to perform given operations to the data, similar to the control circuit 213 of the storage subsystem 2 described in Embodiment 1 or 2.

Furthermore, the target I/F 21' has a PCIe endpoint (not shown), and this endpoint is connected to a root complex 331 that the I/F 33 has. A part or all of the resisters and memory 212' of the target I/F 21' are mapped to the address of the PCIe space to which the I/F 33 and the target I/F 21' belong. Therefore, the processor 31 of the server 3' can directly access the resister or the memory 212' of the storage device 2' by issuing an input/output request designating the address in the PCIe space. Further, the DMAC that the I/F 33 has is also capable of reading and writing data directly with respect to the resisters and the memory 212' of the storage device 2', similar to the processor 31.

According to the storage device 2' of Embodiment 3, the write data from the server 3' is temporarily stored in the memory 212'. The data stored in the memory 212' is thereafter stored in the NVM 22' by the processor 211' of the storage device 2'. The process of storing the data from the memory 212' to the NVM 22' is called "destaging". The server 3 writes data and commands to the memory 212' and the like of the storage device 2' using the DMAC within the I/F 33. However, the processor 31 can directly write data and commands to the memory 212' and the like without using the DMAC. The storing area of commands and data within the storage device 2' will now be described with reference to FIG. 15.

The storage device 2' has a command-storing area 401' and a data-storing area 402'. The command-storing area 401' exists in a resister area disposed within the target I/F 21', and the data-storing area 402' is within the memory 212'. However, the command-storing area 401' can also be disposed within the memory 212'. Here, a configuration is illustrated where the command-storing area 401' and the data-storing area 402' exist in non-contiguous areas, but it is also possible to have the command-storing area 401' and the data-storing area 402' disposed in adjacent areas. Further, a configuration similar to Embodiment 1 can be adopted where the command and the data to be written together with the command are stored in contiguous areas. In that case, the command-storing area 401' and the data-storing area 402' will not be distinguished.

According to the computer system of Embodiment 3, the start address of the command-storing area 401' is X, and the start address of the data-storing area 402' is Y. Both address X and address Y are the addresses that the processor 31 (or the DMAC of the I/F 33) uses when the processor 31 (or the DMAC of the I/F 33) of the server 3' performs access, that is, the address in the PCIe space. The size of the area for storing a single command is CSZ bytes. Similarly, the size of the area for storing the data transmitted together with a single command is determined to be DSZ bytes. The number of commands capable of being stored in the command-storing area 401' is M, and the number of data capable of being stored in the data-storing area 402' is also M.

Figure 22:
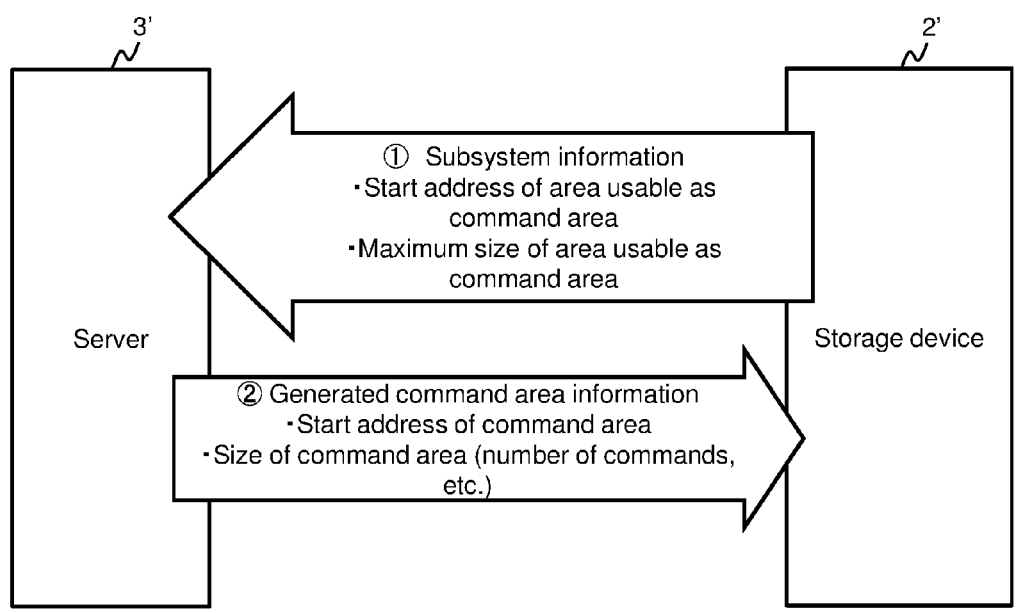
FIG. 22 is a view illustrating an example of information communicated between a server and a storage device during initialization.

The values of X, Y and M are not always fixed. It can be determined by negotiation between the server 3' and the storage device 2' at the time of initialization (such as when starting the server 3' or when the storage device 2' is connected to the server 3'), for example. For example, as illustrated in FIG. 22, at the time of initialization, the server 3' can acquire, from the storage device 2', the start address of the area capable of being used as the command-storing area 401' and the maximum size of this area, and the start address of the area capable of being used as the data-storing area 402' and the maximum size of this area.

The server 3' determines the values of X, Y and M based on these configuration information acquired from the storage device 2'. Assuming that all the areas usable as the command-storing area 401' (or the data-storing area 402') is used, X should be set as the start address of the area useable as the command-storing area 401'. Further, Y should be set as the start address of the area usable as the data-storing area 402'.

Further, M (number of commands/data capable of being stored in the command-storing area 401' or the data-storing area 401') should be set to the smaller value out of the maximum size capable of being used as the command-storing area 401'÷command size (CSZ) or the maximum size capable of being used as the data-storing area 401'÷data size (DSZ).

Further, in a configuration where the server 3' has multiple processors 31, or where the processor 31 has multiple processor cores, and the respective processors 31 (or respective processor cores) access the storage device 2' in parallel, the size calculated based on the command-storing area 401'÷number of processor (cores) can be set as the size of the command-storing area 401' (or the data-storing area 401') to be assigned to each processor 31 (or each processor core).

However, the server 3' is not always required to use the whole area capable of being used as the command-storing area 401' (or the data-storing area 402'). For example, if the I/O processing performance of the storage device 2' is high and multiple commands can be processed in parallel, it is preferable to have a large amount of commands stored at once in the area within the storage device 2'. In that case, the size of the command-storing area 401' (or the data-storing area 401') should be set high.

However, if the I/O processing performance of the storage device 2' is low, a significant improvement in performance cannot be expected by providing a large command area and storing a large amount of commands in the cache area within the storage device 2'. Rather, the area for storing commands should preferably be small, so as to reduce the cost of the storing area for storing the commands. If the storage device 2' is equipped with a battery (or capacitor) for backup purpose, the battery is required to have greater capacity as the storing area becomes greater. Therefore, in a storage device configured to retain data stored in the command-storing area and the data storing area during power failure (or to save the same to the NVM 22'), the command-storing area 401' (or the data-storing area 402') should preferably be set variable with respect to the capacity of the battery being installed (or charged).

Figure 23:
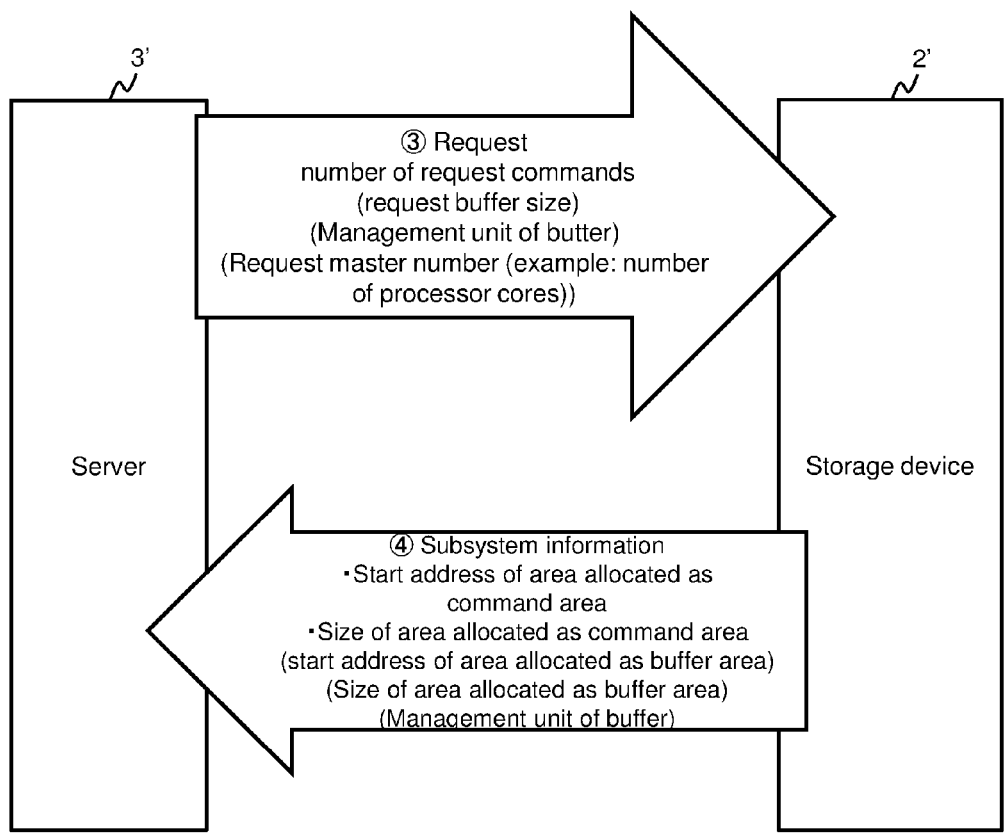
FIG. 23 is a view illustrating an example of information communicated between the server and the storage device during initialization.

The method for determining the address/size of the command-storing area 401' (or the data-storing area 402') is not restricted to the method for determining the same by the server 3' based on the configuration information acquired from the storage device 2'. For example, as illustrated in FIG. 23, it is possible to determine the size by having the server 3' request the number of requested commands to the storage device 2', and based on the request, having the storage device 2' create the command-storing area 401' (or the data-storing area 401') and respond the information (start address, size and the like) related to the created command-storing area 401' (or the data-storing area 401') to the processor 31.

Further, the request can include, in addition to the number of request commands (such as the number of commands capable of being loaded), the size of the buffer to be used as the transfer destination area of the write data. It is also possible to send information designating the management unit of the transferred data (maximum size of write data designated by a single command). The storage device 2' having received the request allocates the command-storing area 401' (or the data-storing area 402') based on the request in the memory 212', and returns the start address and the size of the allocated area and the management unit of data as the response to the request.

As described, according to the present embodiment, the command-storing area 401' (or the data-storing area 402') is set in advance through the communication between the storage device 2' and the server 3'. Thereby, a required area can be set between the storage device 2' in which the command-storing area 401' (or the data-storing area 402') is set and the server 3' writing the command into the command-storing area, and the related information is shared.

Figure 6:
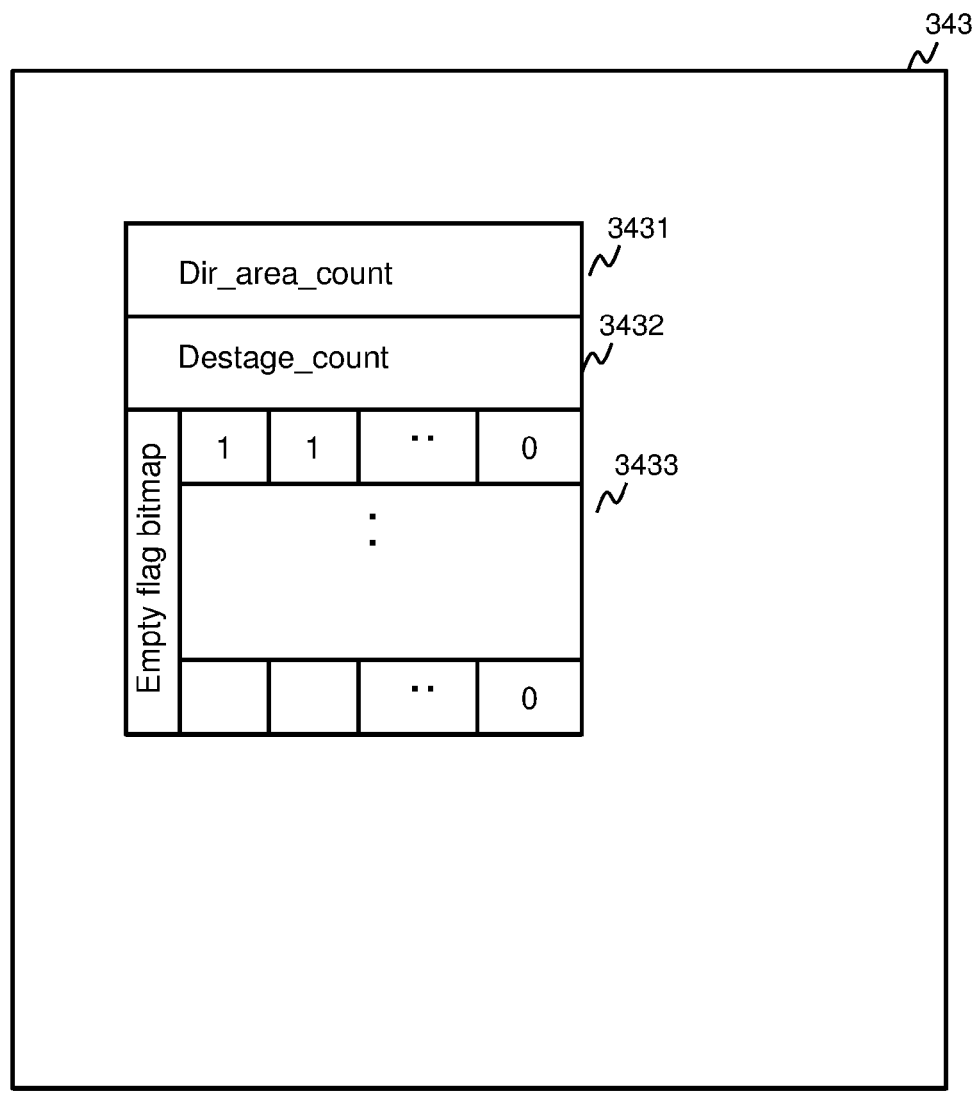
FIG. 6 is a view illustrating a management information of a server area.

Next, we will describe the method for managing the command-storing area 401' and the data-storing area 402' according to the computer system of Embodiment 3. The management of the command-storing area 401' and the data-storing area 402' is performed by the processor 31 of the server 3'. According to the computer system of Embodiment 1, as illustrated in FIG. 6, information of the Dir_area_count (3431), the Destage_count (3432) and the Empty_flag_bitmap (3433) are retained in the transfer module 34. Similarly, in the computer system according to the present embodiment, the Dir_area_count (3431), the Destage_count (3432) and the Empty_flag_bitmap (3433) are managed. However, according to the computer system of the present embodiment, these information are placed in the memory 32 of the server 3', and referred to by the processor 31, which differ from the computer system of Embodiment 1. The other points are similar to Embodiment 1, so that the information will not be illustrated in the drawings.

The roles of the Dir_area_count (3431), the Destage_count (3432) and the Empty_flag_bitmap (3433) are similar to Embodiment 1. Therefore, when Dir_ area_count (3431) is n (n is a non-negative integer equal to or less than M), it indicates that a command has been written to the area of address X+CSZ×(n−1) (command-storing area 401') and that data has been written to the area of address Y+DSZ×(n−1) (data-storing area 402') by the high-speed write processing performed the last time.

Similarly, when Destage_count (3432) is n, it indicates that the data having been stored in the area of address Y+DSZ×(n−1) has been destaged by the most recently performed destage processing. When the n-th bit of the Empty_flag_bitmap (3433) is 1, it indicates that the data stored in the area of address Y+DSZ×(n−1) (data-storing area 402') has already been destaged. Similar to Embodiment 1, the n-th bit in the Empty_flag_bitmap (3433) is denoted as empty[n]. Further, M is set as the initial value of both the Dir_area_count (3431) and the Destage_count (3432). In the initial state, all bits of the Empty_flag_bitmap (3433) are set to 1.

Figure 16:
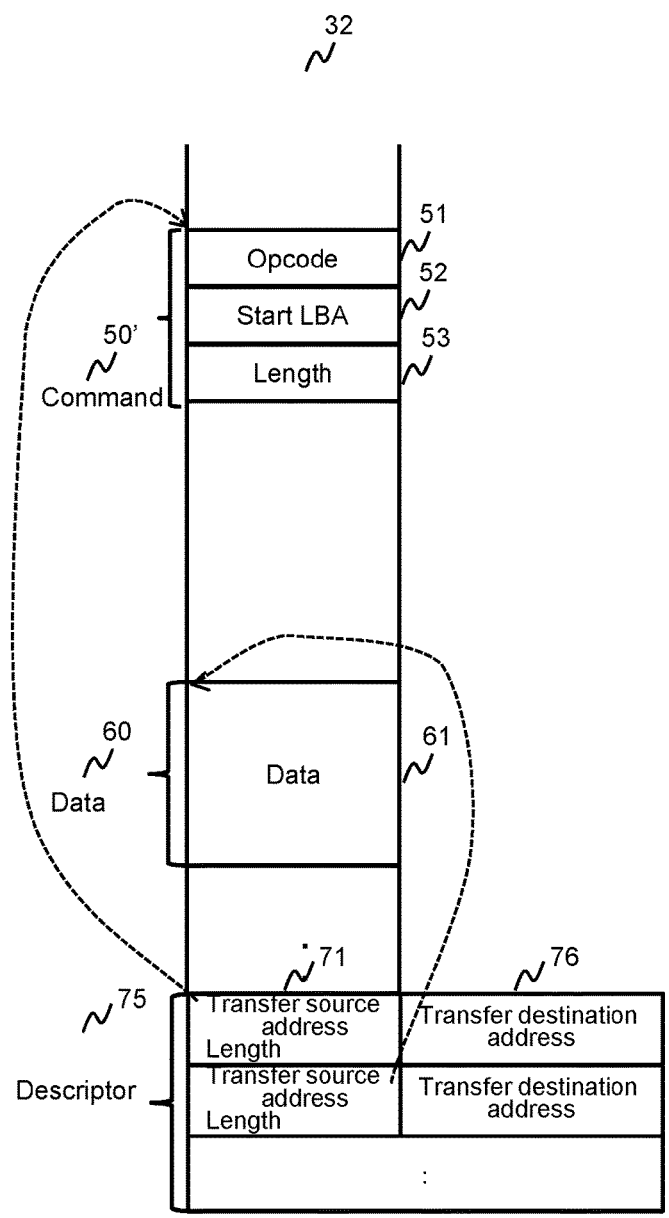
FIG. 16 illustrates an example of a command format.

Next, the example of the format of a command created by the server 3' in the computer system according to Embodiment 3 will be described with reference to FIG. 16. In FIG. 16, command 50' illustrates a command created by the server 3. The command 50' is created in the memory 32. The command 50 includes an operation code (Opcode) 51, a start LBA 52, and a data length (Length) 53. The meaning of the operation code 51, the start LBA 52 and the data length 53 are the same as those described in Embodiment 1. The command 50' can include other information. For example, if the server 3' adds DIF to the data and writes the same in the storage device 2', information required for verification using the DIF (such as the volume address (LBA) being the storage destination of data or information capable of deriving the address) is included in the command 50'.

The server 3' creates a command, and also creates information called a Descriptor 75 in the memory 32. The Descriptor 75 is information handed over to the DMAC of the I/F 33. The Descriptor 75 has multiple sets composed of a transfer source address/length 71 and a transfer destination address 76. One set of the transfer source address/length 71 and the transfer destination address 76 within the Descriptor 75 stores information related to the storing area of the command 50'. Specifically, the address of the command 50' in the memory 32 and the length of the command 50' are stored in the transfer source address/length 71. On the other hand, the storage destination address of the command 50' in the storage device 2' (such as the address X+CSZ×(n−1) and the like) is stored in the transfer destination address 76.

Even further, information related the storing area of the data (data 60 of FIG. 16) written together with the command 50' to the storage device 2' is stored in other set of the transfer source address/length 71 and the transfer destination address 76 within the Descriptor 75. Specifically, the address in the memory 32 and the length of the data 60 is stored in the transfer source address/length 71, and the storage destination address (such as the address Y+DSZ×(n−1) described in FIG. 15) in the transfer destination (that is, the storage device 2') of this data 60 is stored in the transfer destination address 76. The DMAC writes the command 50' and the data 60 placed in the memory 32 to the memory in the storage device 2' in accordance with the Descriptor 75.

Next, with reference to FIG. 14, the flow of the process performed in the respective components when the server 3' writes data into the volume of the storage device 2' using the high-speed write function will be described. Many of the processes are similar to the process of Embodiment 1 illustrated in FIG. 2, so the difference from Embodiment 1 will mainly be described in the following description.

S1 is the same as that described in Embodiment 1. In S2', the processor 31 judges whether commands and data are writable to the area of the storage device 2', before issuing the high-speed write command. The details of this process will be described later.

In S3, the processor 31 creates the command 50' described in FIG. 16, and in S3', the processor 31 creates the Descriptor 75 described in FIG. 16. Thereafter, the processor 31 issues a data transfer instruction to the DMAC in the I/F 33 (S4'). Since the address in the memory 32 where the Descriptor 75 is located is included in the data transfer instruction, the DMAC writes the transfer target data (and command) to the memory 212' etc. in the storage device by reading the Descriptor 75. At this time, similar to Embodiment 1, an Attribute is added to the transfer target data, and the data having the Attribute added thereto is written to the memory 212'.

According to the computer system of Embodiment 3, the DMAC writes the data to the memory 212', and thereafter, stores the command in the resister in the storage device 2'. In the storage device 2', when data is written from the server 3' to the resister, the target I/F 21' verifies the data stored in the data-storing area 402' of the memory 212'. The process of adding the Attribute and verifying data are not indispensable, similar to Embodiment 1.

When S10 is completed, the processes of S11, S11' and S13 are performed. These processes are the same as those described in Embodiment 1.

The processor 211' performs the destage processing after the data write from the server 3' is completed (S22). Similar to Embodiment 1, the destage processing can be started by the processor 211' at the timing where completion of process is notified (S11') from the target I/F 21' to the processor 211', or the destage processing can be executed periodically by the processor 211'.

When destaging is completed, the processor 211 notifies the server 3' that destaging has been completed (S22'). This notification is performed by the processor 211' writing information to the memory 32 using the target I/F 21'. When the processor of the server 3' detects that information stating that destaging is completed has been written to the memory 32, it updates the management information (S24). This process is a similar process as that described in S23 of Embodiment 1, and the details thereof will be described later.

Next, the details of the process performed in the server 3' during S2' through S13 of FIG. 14 will be described with reference to FIG. 17.

Steps S101 through S105 correspond to S2' of FIG. 14. Here, whether the command and the data can be written to the storage device 2' or not is judged. This process is a similar to the steps S101 through S105 of FIG. 7 illustrated in Embodiment 1. However, in the computer system according to Embodiment 1, the transfer module 34 had executed this process, but in the computer system according to Embodiment 3, this process is executed by the processor 31.

S105' is a process corresponding to S3 of FIG. 14, in other words, the process that the processor 31 creates the command 50'. Also, the processor 31 stores 0 in empty[Dir area count].

Next, the processor 31 creates the Descriptor 75 (S106, S108). At that time, the processor 31 uses the Dir_area_count (3431) to compute the start address of the transfer destination of the command, and the start address of the transfer destination of the data (S106). If the start address of the command-storing area 401' is X, the start address of the data-storing area 402' is Y, and the Dir_area_count (3431) is n (n is a non-negative integer equal to or smaller than M), the transfer destination start address of the command is "X+CSZ×(n−1)" and the transfer destination start address of the data is "Y+DSZ×(n−1)".

In S108', the processor 31 creates the Descriptor 75 based on the transfer destination start address computed in S106. When the Descriptor 75 is created, it instructs the DMAC of the I/F 33 to start data transfer.

When a notice stating that the write process has been completed is received from the storage device 2' (process corresponding to S13 of FIG. 14), the process is ended (S110').

When the server 3' receives a notice stating that the destaging has been completed from the storage device 2' (S22' and S24 of FIG. 14), it updates the Empty_flag_bitmap (3433). This process is similar to the process of FIG. 8 described in Embodiment 1. What differs from the description of Embodiment 1 is that in the computer system according to Embodiment 3, the processing of FIG. 17 is performed by the processor 31 of the server 3', and that the Destage_count (3432) and the Empty_flag_bitmap (3433) are placed in the memory 32. The other points are the same, so they will not be described here. The process performed by the storage device 2' is the same as the process performed by the storage subsystem 2 according to Embodiment 1. That is, a dirty flag corresponding to the area in which each command (or each data) is stored, a destage pointer and a next_ptr are prepared, and each time a write processing from the server 3' is completed, the dirty flag and the next_ptr are updated. Then, each time the destaging is completed, the dirty flag and the destage pointer should be updated.

Embodiment 4

A case where the server transmits both the command and the data to the storage subsystem (or the storage device) at the time of write processing has been illustrated above. However, it is also possible to have only the command transmitted. Embodiment 4 describes a case where the server transmits only the command to the storage device.

Figure 18:
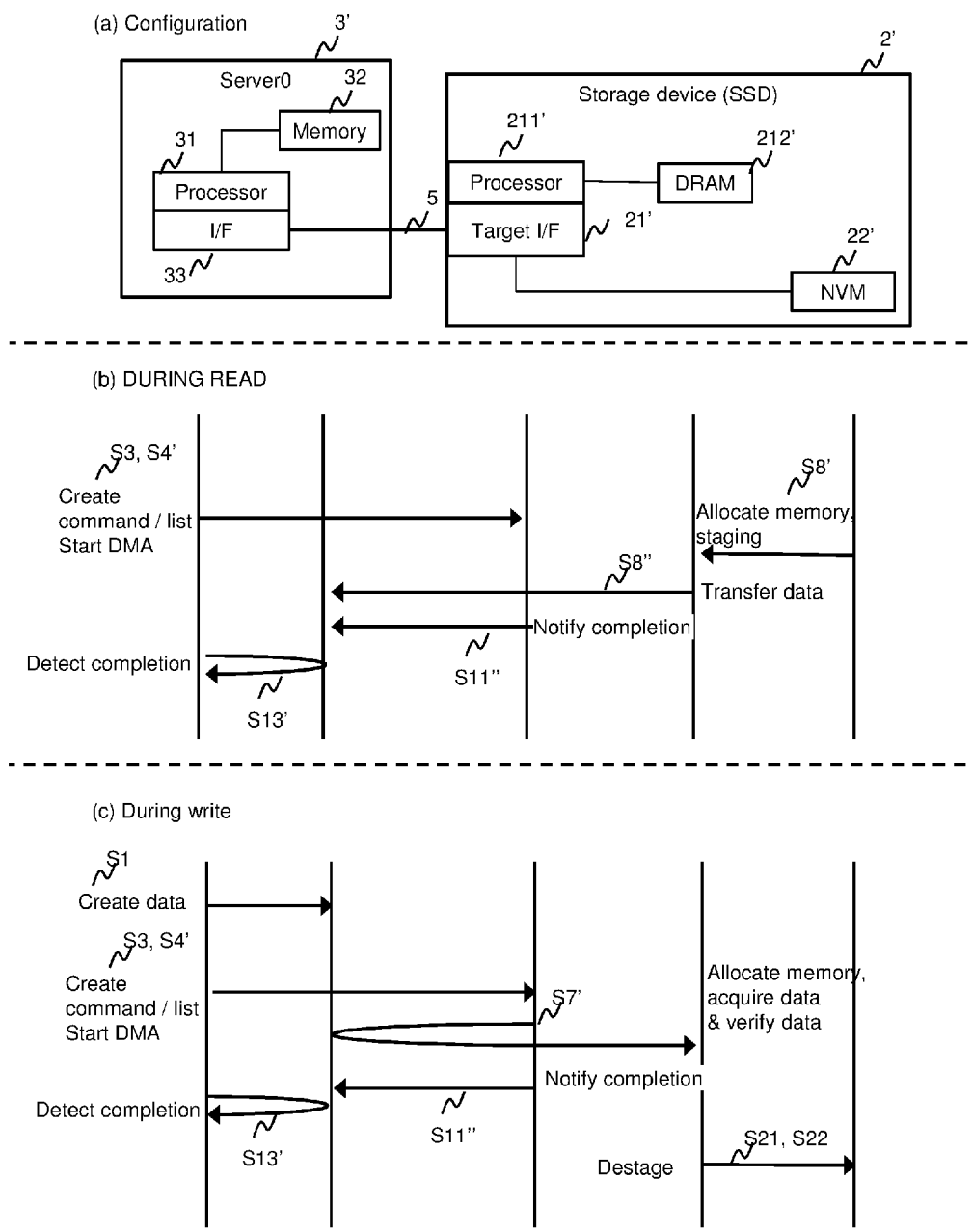
FIG. 18 is an explanatory view of a configuration and an overall flow of I/O processing of a computer system according to Embodiment 4.

The configuration of the computer system according to Embodiment 4 is illustrated in an upper section (a) of FIG. 18. The configuration of the computer system according to Embodiment 4 is similar to the computer system according to Embodiment 3. However, it can adopt a similar configuration as the computer system according to Embodiment 1 or 2.

The ladder chart illustrated in a middle section (b) of FIG. 18 illustrates the flow of the process performed when the server 3' issues a read command to the storage device 2'. When issuing the read command, the processor 31 creates a command and an address list (S3), and writes the command and the address list to the resister (or the memory 212') of the storage device 2' using the DMAC (S4'). The contents of the command and the address list will be described later.

The contents of the command are analyzed in the storage device 2' in which the command and the address list were written. Based on the analyzed content of the command, a storing area for storing data is allocated in the memory 212'. This is a well-known process. Thereafter, the processor 211' reads data from the NVM 22', and stores the read data to the allocated storing area for storing data (S8': this process is called "staging"). After staging, the processor 211' transfers the data stored in the memory 212' to the server 3' (S8"). Here, the transfer destination of data is determined based on the address list received in S3.

When S8" is completed, the processor 211' stores the notice that the read processing has been completed to the memory 32 (S11"). When the processor 31 of the server 3' detects this notice (S13'), the read processing is completed.

The ladder chart illustrated on the lower section (c) of FIG. 18 illustrates the flow of the process when the server 3' issues a write command to the storage device 2'. At first, the processor 31 of the server 3' executes a program such as DBMS to create data to be written to the volume, and stores the same in the memory 32 (S1). Thereafter, the processor 31 creates a command and an address list (S3), and writes the command and the address list to the resister (or the memory 212') of the storage device 2' using the DMAC (S4'). The contents of the command and address list will be described later.

The contents of the command are analyzed in the storage device 2' in which the command and the address list were written. Then, based on the analyzed contents, the storing area for storing data is allocated in the memory 212'. Then, the processor 211' retrieves the write data from the memory in the server 3', and stores the retrieved data to the allocated storing area for storing data (S7').

After S7', the processor 211' stores a notice stating that the write processing has been completed to the memory 32 (S11"), and the processor 31 of the server 3' detects this notice (S13'). The storage device 2' performs the destage processing after S11" (S21, S22).

In the computer system according to Embodiment 4, the server 3' writes the command (and the address list) directly to the memory (or resister) of the storage device 2'. However, the determination of the area of the memory 212' for storing the data and the data transfer to the memory is carried out by the storage device 2'.

The storing area of the command within the storage device 2' in Embodiment 4 is the same as the command-storing area 401' illustrated in FIG. 15. Further, the processor 211' of the storage device 2' determines the data-storing area based on a well-known technique, so that it differs from the data-storing area 402' disclosed in FIG. 15. The data-storing area will not be described here. As described in Embodiment 3, the location and size of the command-storing area 401' is not always fixed. It can also be determined by performing negotiation between the server 3' and the storage device 2' at the time of initialization.

Figure 21:
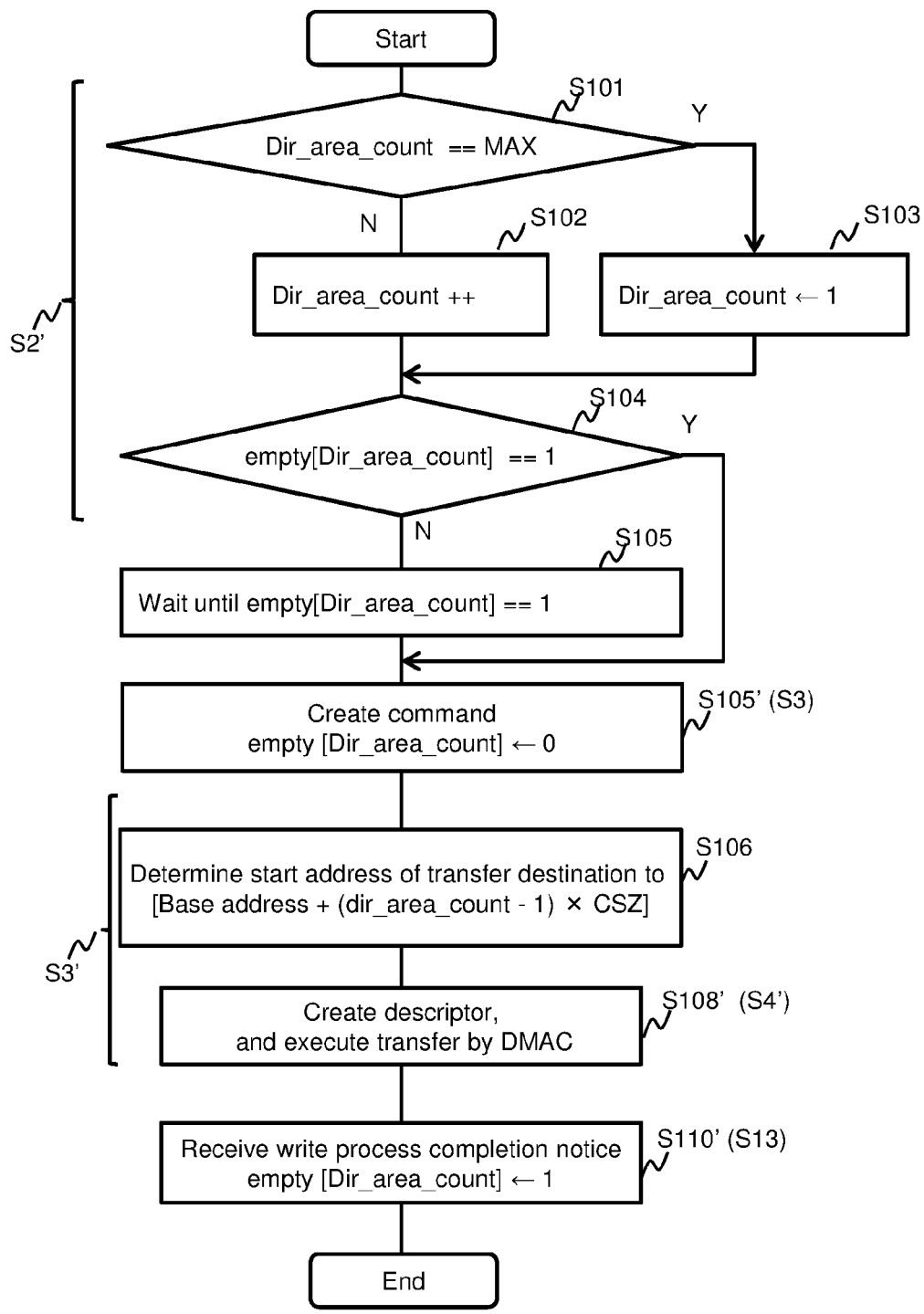
FIG. 21 is a flowchart of a process executed by a server.

Next, the details of the processing performed in the server 3' between S3 through S13' of FIG. 18 will be described with reference to FIG. 21. Since most part of the present processing is similar to the processing illustrated in FIG. 17, the differences from FIG. 17 will be described below. The processing described below is the same both for the case where a read command is issued and a case where a write command is issued.

Figure 17:
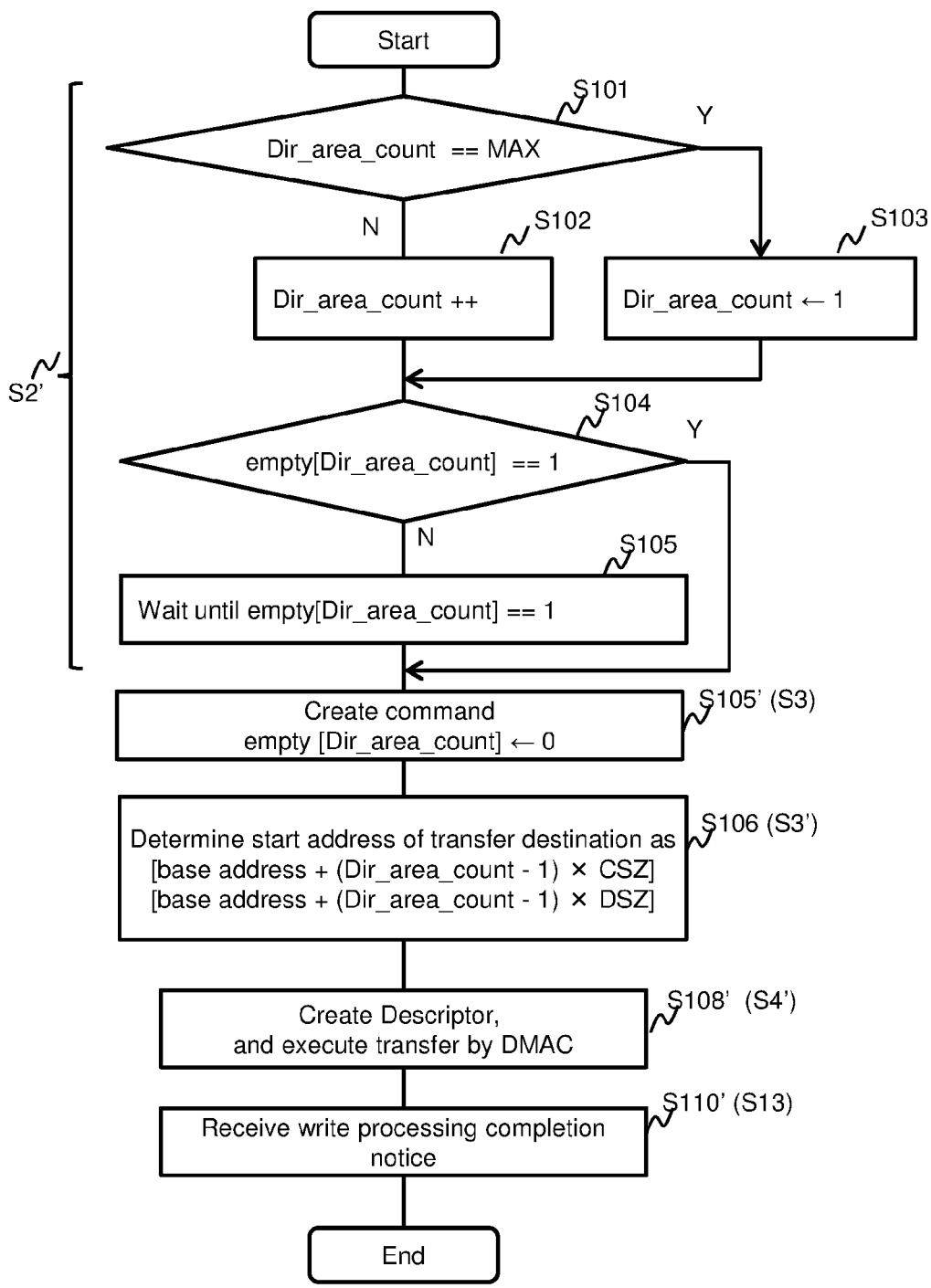
FIG. 17 is a flowchart of a process executed by a server.

Steps S101 through S105' are the same as FIG. 17. Since the content of the created commands differ from those described in Embodiment 3, they will be described later.

In S106, the processor 31 determines the transfer destination address of the command. The point that differs from S106 of FIG. 17 is that in S106 of Embodiment 4, the transfer destination address of the data is not calculated, but as for other points, S106 of FIG. 21 and S106 of FIG. 17 are the same.

In S108', the processor 31 instructs to start data transfer to the DMAC of the I/F 33. At this time, the processor 31 notifies the address in the memory 32 storing the command to the DMAC.

When a notice is received from the storage device 2' stating that the write processing is completed (process corresponding to S13' of FIG. 18), the processor 31 stores 1 in empty[Dir area count], and ends the process. In the computer system according to Embodiment 4, a new command can be written to the command-storing area when the write processing has been completed, even if destaging of data is not completed.

Figure 8:
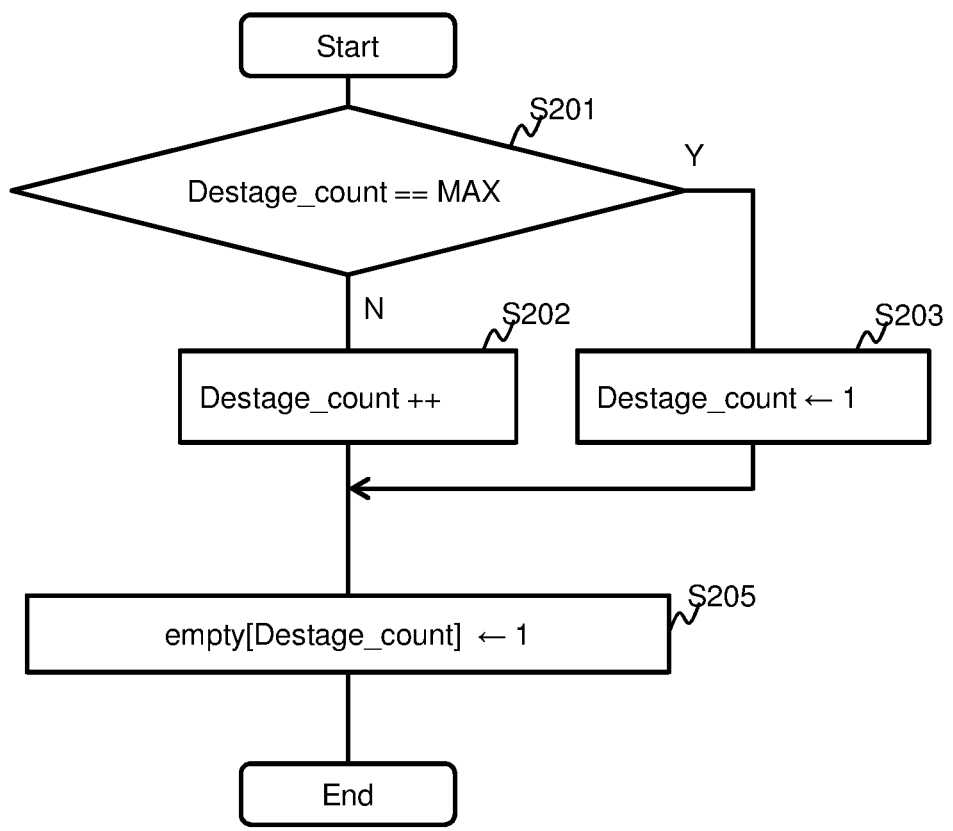
FIG. 8 is a flowchart of a process executed by the transfer module.

In the computer system according to Embodiment 1 or Embodiment 3, the Empty_flag_bitmap (3433) has been updated at the timing when the server receives a notice notifying that destaging has completed (FIG. 8). However, this process is not performed in the computer system according to Embodiment 4. Therefore, out of the management information managed by the server 3' in Embodiment 3, the Dir_area_count (3431) and the Empty_flag_bitmap (3433) are managed by the server 3' according to Embodiment 4, but the Destage_count (3432) is not required to be retained.

Figure 19:
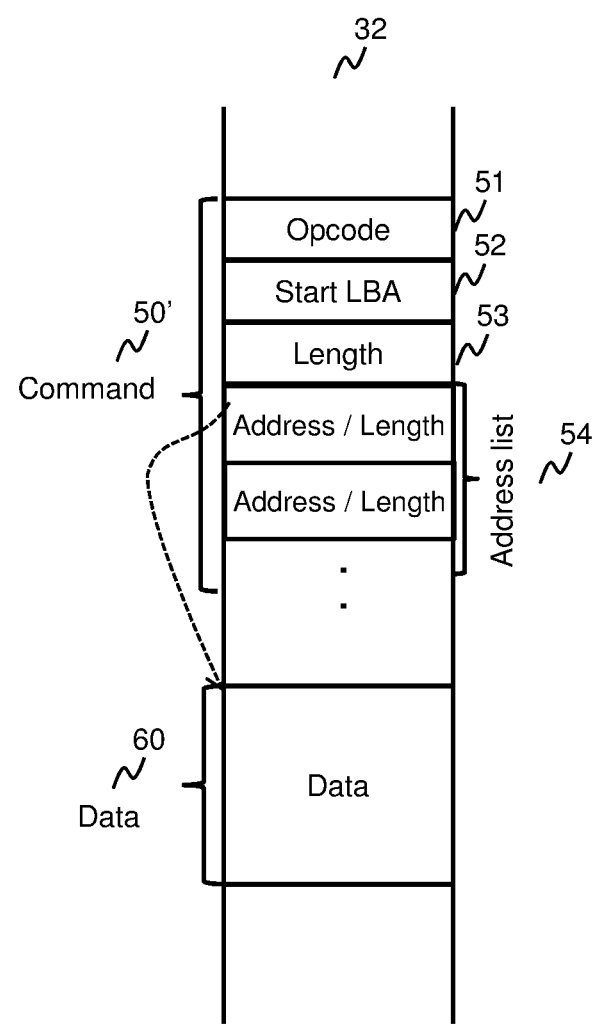
FIG. 19 is an example of a command format.

With reference to FIG. 19, the example of the format of a command created by the server 3' of Embodiment 4 will be described. Similar to the computer system according to Embodiment 3, the command 50' is created in the memory 32. The command 50 includes an operation code (Opcode) 51, a start LBA 52, a data length (Length) 53, and an address list 54. The meaning of the operation code 51, the start LBA 52 and the data length 53 is the same as that described in Embodiment 1 and Embodiment 3. Other information can also be included in the command 50'.

Pluralities of information of the addresses in the memory 32 and the area length (Length) in which the read target data or write target data is stored are recorded in the address list 54. When the address list 54 is written to the storage device 2' together with the write command, the storage device 2' reads the data from the area in the memory 32 specified by the address and data length stored in the address list 54, and stores the same in its own memory 212'. When the address list 54 is written together with the read command to the storage device 2', the storage device 2' stores the data which was read from the NVM 22' to the area in the memory 32 specified by the address and data length stored in the address list 54.

Multiple sets of address and area length information are stored in the address list 54 when the write target data is dispersed in scattered areas in the memory 32 (or when contiguous areas having a length designated by the Length 53 could not be allocated in the memory 32 when the processor 31 tries to allocate the area for storing the read data when the read command has been issued). When the write target data is stored in contiguous areas in the memory 32 during the write processing, only the start address of the area (in the memory 32) in which the write target data is located should be stored in the address list 54. Further, if contiguous areas having a length designated by the Length 53 could be allocated in the memory 32 during the read processing, only the start address of the allocated area should be stored in the address list 54.

Figure 20:
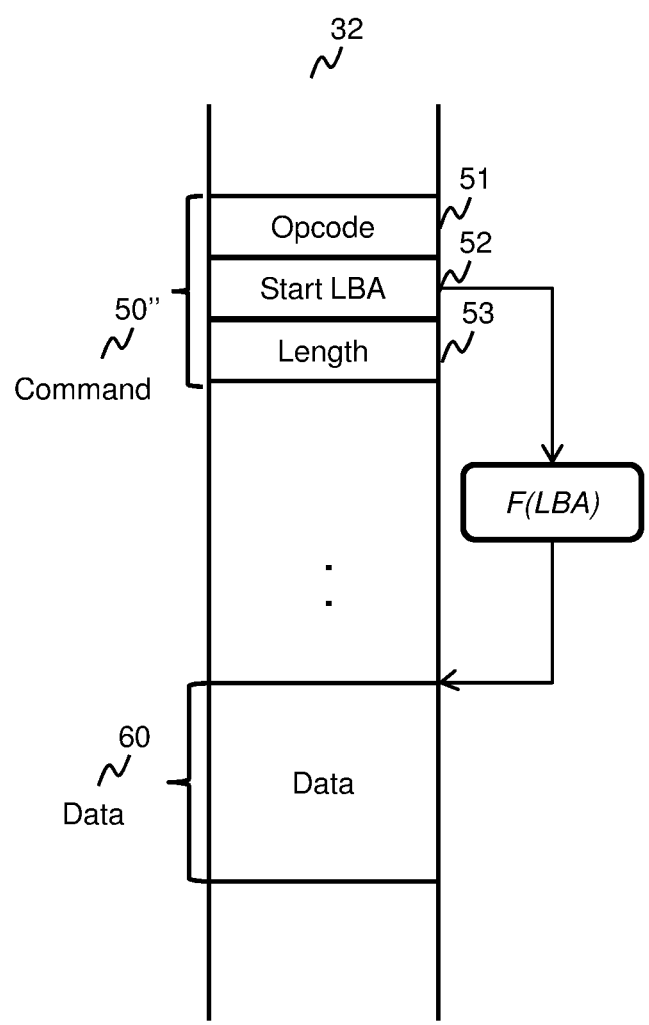
FIG. 20 is an example of a command format.

Next, a different example (modified example) of the format of a command created by the server 3' according to Embodiment 4 will be described with reference to FIG. 20. In this modified example, a static relationship is established between the start LBA 52 (that is, the start address of the write destination of write data in the storage space of the volume provided by the storage device 2' to the server 3') and the address in the memory 32 of the write data (or read data).

Hereafter, the example of a case where a write command has been issued will be described. When the processor 31 stores the write data to the memory 32 (in S1 of FIG. 18), the LBA of the data write destination volume is also deter-mined. Now, we will assume that the LBA of the data write destination volume is A. In that case, the processor 31 uses an address conversion function $F(x)$ to calculate $F(A)$, and stores the write data to contiguous areas having address $F(A)$ in the memory 32 as the start address.

On the other hand, the storage device 2' also has an address conversion function $F(x)$, similar to the server 3'. When the storage device 2' receives a write command from the processor 31, the storage device 2' refers to the start LBA 52 (hereafter, the value of the start LBA 52 is assumed as A), and calculates $F(A)$. Then, when write data is read from the memory 32, data is read from contiguous areas having $F(A)$ as the start address, and stored in its own memory 212'.

By providing such rule, the command 50'' is only required to include the operation code (Opcode) 51, the start LBA 52 and the data length (Length) 53, and there is no need to designate the address in the memory 32 storing the write data.

The example of a write command has been described, but a similar process can be performed when issuing the read command. After the read target LBA of the volume is determined in the server 3' (a case is assumed where the determined LBA is B), the processor 31 calculates $F(B)$, and allocates contiguous areas having address $F(B)$ as the start address in the memory 32.

When the storage device 2' receives the read command, it refers to the start LBA 52, and calculates $F(B)$. Then, when transferring the data read from the NVM 22' to the memory 32 of the server 3', data should be written to contiguous areas having $F(B)$ as the start address.

The preferred embodiments of the present invention have been described, but the embodiments are mere examples for implementing the present invention, and they are not intended to restrict the scope of the present invention to the illustrated embodiments. The present invention can also be implemented in various other types of forms.

For example, according to the respective embodiments described above, the start LBA of a volume is included in the command being written from the server to the storage subsystem (storage device), but it is also possible to not include the start LBA in the command. In that case, the storage subsystem stores the terminal address of the volume (or drive) where the write data has been currently written, and performs the subsequent data write operation (destaging to the drive) to the subsequent address of the terminal address. Thereby, the amount of information required when writing the command can be reduced.

REFERENCE SIGNS LIST

1: Computer system
2: Storage subsystem
3: Server
21: Controller (CTL)
22: Storage device
23: Switch
31: Processor
32: Memory
33: I/F
34: Transfer module
211: Processor
212: Memory
213: Control circuit
214: I/F
215: BEIF
341: MPU
342: DMA controller (DMAC)

343: Memory
344: Endpoint
345: Endpoint

The invention claimed is:

1. A computer system comprising a server, and a storage subsystem receiving an access request from the server,
the storage subsystem comprising a nonvolatile storage media configured to preserve a write data from the server, and a memory configured to temporarily store information written from the server;
wherein the storage subsystem is configured to notify a configuration information to the server for designating a storing area in the memory to which information from the server is written,
the memory comprises a storing area to which information from the server is written, the storing area being configured based on the configuration information acquired from the storage subsystem,
the server has a management information related to usages of the storing area,
in a state where the server writes the information to the storage subsystem, the server determines an address in the storing area to which information is written based on the management information, and
the server writes the information to the above-determined address in the storing area.

2. The computer system according to claim 1,
wherein the information includes a command, and
in a state where the command stored in the storing area is a write command, the storage subsystem reads the write data from the server and stores the write data in the memory, based on a storage position information of the write data in the server included in the write command.

3. The computer system according to claim 2,
wherein in a state where the command is a read command requesting to read data from the nonvolatile storage media of the storage subsystem, the storage subsystem reads the data from the nonvolatile storage media, and stores the read data to an area in the memory of the server.

4. The computer system according to claim 2,
wherein in a state where the server receives a notice that the writing of information has been completed from the storage subsystem, the server records in the management information that a partial area to which the information has been written is usable.

5. The computer system according to claim 1,
wherein the information includes a write data to be written to the nonvolatile storage media, and
in a state where the server stores the write data to the storing area, the server records in the management information that a partial area to which the write data has been stored is unwritable.

6. The computer system according to claim 5,
wherein after the storage subsystem destages the write data to the nonvolatile storage media, the storage subsystem notifies the server that the destaging of the write data is completed, and
in response to receiving the notification, the server records in the management information that a partial area to which the destaged write data has been stored is usable.

7. The computer system according to claim 5,
wherein the management information includes a resister capable of being set from the storage subsystem for notifying the server whether the storing area from the server is writable,
the storing area has multiple partial areas configured to store the information,
the storage subsystem manages a position information of the partial area where the server performs subsequent write operation, and in a state where data of the partial area is not yet destaged to the nonvolatile storage media, the storage subsystem writes information to the resister that the storage area is unwritable, and
in a state where information is stored in the resister stating that the storing area is unwritable, the server suspends write of the information.

8. The computer system according to claim 7,
wherein at a point of time where data in the partial area to which the server performs the subsequent write operation is destaged, the storage subsystem writes information to the resister stating that the storing area is writable.

9. The storage subsystem comprising a nonvolatile storage media configured to preserve write data from the server, and a memory configured to temporarily store information written from the server;
wherein the memory includes a storing area to which information is written from the server, the storing area being an area determined by negotiation with the server, and
in a state where a write command is stored in the storing area by the server, the storage subsystem reads the write data from the server based on a storage position information of the write data included in the write command, and stores the information stored in the memory to the storing area.

10. The storage subsystem according to claim 9,
wherein during initialization, the storage subsystem notifies a configuration information of the storing area capable of being used by the server to the server.

11. A computer system comprising a server, and a storage subsystem configured to receive an access request from the server;
wherein the server has a processor, a memory, and a transfer module configured to perform data transfer to the storage subsystem,
the storage subsystem has a nonvolatile storage media for preserving a data instructed to be written by a write command from the server, and a storing area for temporarily storing the data and the write command, wherein the storing area includes M number (M≥1) of partial areas storing a set of the data and the write command,
the transfer module has a management information related to usages of the respective partial areas,
the processor is configured to create the write command for instructing storage of created data to the nonvolatile storage media, and transmit a data transfer request to the transfer module,
the transfer module having received the data transfer request determines whether the data and the write command are writable to the partial area by referring to the management information, and
in a state where data is writable, the transfer module designates an address of the writable partial area, and stores the data and the write command to the partial area.

12. The computer system according to claim 11,
wherein the management information has M number of flags indicating whether data not-yet-destaged to the nonvolatile storage media is stored in the partial area, the storage subsystem destages the data stored in the partial area to the nonvolatile storage media, and notifies the transfer module that destaging has been performed, and the transfer module updates the management information based on the notice.

13. The computer system according to claim 12, wherein in a state where the transfer module stores the data and the write command to the N-th (1≤N≤M) partial area, it sets the N-th flag to a state where non-destaged data is stored, in a state where the notice notifying that the data stored in the N-th partial area has been destaged is received, the N-th flag is updated to a state where non-destaged data is not stored, and in a state where the N-th flag is set to a state where the non-destaged data is not stored, the system determines that the data and the write command to the N-th partial area are writable.

14. The computer system according to claim 13, wherein the storage subsystem is configured to perform destaging of data to the nonvolatile storage media sequentially, starting from the data stored in a first partial area, the transfer module has a destage counter configured to manage a number of the partial area to which the storage subsystem most recently performed destaging, and in a state where the transfer module receives a notice from the storage subsystem stating that destaging has been performed, one is added to the destage counter, and the flag corresponding to the destage counter value is set to a state indicating that non-destaged data is not stored.

15. The computer system according to claim 11, wherein the management information includes a resister indicating whether the storing area is writable, the transfer module is configured to store the data and the write command sequentially in order, starting from the first partial area, the storage subsystem manages a position information of the partial area to which the transfer module performs the subsequent write, and in a state where the data of the partial area is not yet destaged to the nonvolatile storage media, the resister is set to unwritable, and in a state where the resister is set to unwritable, the server suspends the write operation of the information.

* * * * *